US011329502B2

(12) United States Patent
DeJonge et al.

(10) Patent No.: US 11,329,502 B2
(45) Date of Patent: May 10, 2022

(54) MODULAR LIGHTING PANEL

(71) Applicant: Lutron Technology Company LLC, Coopersburg, PA (US)

(72) Inventors: Stuart W. DeJonge, Riegelsville, PA (US); Robert C. Newman, Jr., Emmaus, PA (US); Matthew W. Nuhfer, Medford, MA (US); Michael W. Pessina, Allentown, PA (US); Thomas M. Shearer, Macungie, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/078,947

(22) Filed: Oct. 23, 2020

(65) Prior Publication Data

US 2021/0045221 A1 Feb. 11, 2021

Related U.S. Application Data

(60) Continuation of application No. 16/457,962, filed on Jun. 29, 2019, now Pat. No. 10,820,394, which is a (Continued)

(51) Int. Cl.
*H05B 47/18* (2020.01)
*H02J 9/06* (2006.01)
(Continued)

(52) U.S. Cl.
CPC .............. *H02J 9/061* (2013.01); *H05B 33/02* (2013.01); *H05B 45/10* (2020.01); *H05B 45/38* (2020.01); *H05B 47/18* (2020.01); *H05B 45/3725* (2020.01)

(58) Field of Classification Search
CPC .......... H02M 3/22; H02M 3/24; H02M 3/325; H02M 3/335; H02M 3/28; H02M 3/1584;
(Continued)

(56) References Cited

U.S. PATENT DOCUMENTS 5,212,478 A 5/1993 Moseley
5,530,322 A 6/1996 Ference et al.
(Continued)

FOREIGN PATENT DOCUMENTS

FR 3028692 A1 5/2016
WO 2011055192 A1 5/2011
WO 2016079400 A1 5/2016

OTHER PUBLICATIONS

"Redwood System Installation Guide", Redwood Version 2.1, Available at <www.redwoodsystems.com>, Redwood Systems Smart Lights/smart Buildings, Aug. 2012.
(Continued)

*Primary Examiner* — Adolf D Berhane
(74) *Attorney, Agent, or Firm* — Michael Czarnecki; Philip Smith; Glen Farbanish

(57) ABSTRACT

Systems and methods described herein provide examples of an electrical panel (e.g., a modular electrical panel) that is configured to control a plurality of electrical loads. The electrical panel may include a control circuit, memory, a communication circuit, and an alternating current (AC) line feed and/or a direct current (DC) line feed. The electrical panel may also include a plurality of power supplies and a plurality of control modules, where more than one control module is associated with each of the plurality of power supplies. Each control module may configured to receive DC power from the associated power supply and provide an output voltage to at least one electrical load. The electrical panel provides flexibility as to whether each stage of conversion, regulation, and/or control is performed at a control
(Continued)

module located within the electrical panel or performed at an accessory module located at an electrical load.

24 Claims, 6 Drawing Sheets

Related U.S. Application Data division of application No. 15/656,437, filed on Jul. 21, 2017, now Pat. No. 10,548,202.

(60) Provisional application No. 62/365,773, filed on Jul. 22, 2016.

(51) Int. Cl.
*H05B 45/10* (2020.01)
*H05B 45/38* (2020.01)
*H05B 33/02* (2006.01)
*H05B 45/3725* (2020.01)

(58) Field of Classification Search
CPC ........ H02M 3/285; H02M 3/156; H02M 1/32; H02M 1/4208; H02M 7/217; H02M 3/33507; H02M 7/48; H02M 3/31
USPC ........ 363/15, 16, 50, 52, 55, 56, 65, 78, 79, 363/80, 95, 123, 125, 131
See application file for complete search history.

(56) References Cited

U.S. PATENT DOCUMENTS

| | | |
|---|---|---|
| 5,808,417 A | 9/1998 | Ference et al. |
| 6,055,163 A | 4/2000 | Wagner et al. |
| 6,188,181 B1 | 2/2001 | Sinha et al. |
| 6,370,039 B1 | 4/2002 | Telefus |
| 7,566,987 B2 | 7/2009 | Black et al. |
| 7,675,195 B2 | 3/2010 | Mierta |
| 7,741,732 B2 | 6/2010 | Black et al. |
| 7,781,919 B2 | 8/2010 | Black et al. |
| 7,880,638 B2 | 2/2011 | Veskovic et al. |
| 7,936,281 B2 | 5/2011 | Rigatti et al. |
| 8,492,987 B2 | 7/2013 | Nuhfer et al. |
| 8,680,787 B2 | 3/2014 | Veskovic et al. |
| 8,866,401 B2 | 10/2014 | Shearer et al. |
| 9,113,521 B2 | 8/2015 | Gredler et al. |
| 9,155,144 B2 | 10/2015 | Mitterbacher |
| 9,232,574 B2 | 1/2016 | Veskovic |
| 9,247,608 B2 | 1/2016 | Chitta et al. |
| 9,253,829 B2 | 2/2016 | Veskovic |
| 9,565,731 B2 | 2/2017 | DeJonge |
| 9,655,180 B2 | 5/2017 | Stevens, Jr. et al. |
| 10,548,202 B2 | 1/2020 | Dejonge et al. |
| 10,820,394 B2 * | 10/2020 | DeJonge ................. H02J 9/061 |
| 2008/0067954 A1 | 3/2008 | Black et al. |
| 2008/0067959 A1 | 3/2008 | Black et al. |
| 2008/0111491 A1 | 5/2008 | Spira et al. |
| 2008/0136261 A1 | 6/2008 | Mierta |
| 2008/0278297 A1 | 11/2008 | Steiner et al. |
| 2009/0160627 A1 | 6/2009 | Godbole et al. |
| 2009/0271642 A1 | 10/2009 | Cheng et al. |
| 2011/0006603 A1 | 1/2011 | Robinson et al. |
| 2011/0018464 A1 | 1/2011 | Lo et al. |
| 2011/0074222 A1 | 3/2011 | Steiner et al. |
| 2012/0139472 A1 | 6/2012 | Ishibashi |
| 2012/0140363 A1 | 6/2012 | Jeppe et al. |
| 2013/0030589 A1 | 1/2013 | Pessina et al. |
| 2013/0063047 A1 | 3/2013 | Veskovic |
| 2013/0151025 A1 | 6/2013 | Wendt et al. |
| 2013/0181630 A1 | 7/2013 | Taipale et al. |
| 2013/0214609 A1 | 8/2013 | Carmen et al. |
| 2014/0001974 A1 | 1/2014 | Lu et al. |
| 2014/0042933 A1 | 2/2014 | Livschitz et al. |
| 2014/0152101 A1 | 6/2014 | Kusunose |
| 2014/0265568 A1 | 9/2014 | Crafts et al. |
| 2014/0265880 A1 | 9/2014 | Taipale et al. |
| 2014/0334202 A1 | 11/2014 | Cameron |
| 2014/0361699 A1 | 12/2014 | Sullivan et al. |
| 2015/0349567 A1 | 12/2015 | Weightman et al. |
| 2016/0036349 A1 | 2/2016 | Cooper et al. |
| 2016/0172900 A1 | 6/2016 | Welch, Jr. |
| 2016/0329849 A1 | 11/2016 | Nakajima et al. |
| 2017/0111976 A1 | 4/2017 | Van Endert |
| 2017/0123390 A1 | 5/2017 | Barco et al. |
| 2017/0311400 A1 | 10/2017 | Newman, Jr. et al. |
| 2018/0013292 A1 | 1/2018 | White et al. |
| 2018/0027630 A1 | 1/2018 | DeJonge et al. |
| 2018/0367026 A1 | 12/2018 | Rayner et al. |

OTHER PUBLICATIONS

"Redwood Systems' Intelligent Lighting for Data Centers", ANXTER, Redwood Systems Smart Lights/Smart Buildings, Sep. 2013.

\* cited by examiner

MODULAR LIGHTING PANEL

CROSS-REFERENCE TO RELATED APPLICATIONS

This application is a continuation of U.S. patent application Ser. No. 16/457,962, filed Jun. 29, 2019 (now U.S. Pat. No. 10,820,394), which is a divisional of U.S. patent application Ser. No. 15/656,437, filed Jul. 21, 2017, now U.S. Pat. No. 10,548,202, which claims the benefit of Provisional U.S. Patent Application No. 62/365,773, filed Jul. 22, 2016, the disclosures of which are incorporated herein by reference in their entireties.

BACKGROUND

Light-emitting diode (LED) light sources (i.e., LED light engines) are often used in place of or as replacements for conventional incandescent, fluorescent, or halogen lamps, and the like. LED light sources may comprise a plurality of light-emitting diodes mounted on a single structure and provided in a suitable housing. LED light sources are typically more efficient and have longer operational lives as compared to incandescent, fluorescent, and halogen lamps. In order to illuminate properly, an LED driver control device (i.e., an LED driver) may be coupled to the LED light source for regulating the power supplied to the LED light source. The LED driver may regulate either the voltage provided to the LED light source, the current supplied to the LED light source, or both. Examples of LED drivers are described in greater detail in commonly-assigned U.S. Pat. No. 8,492,987, issued Jul. 23, 2010, and U.S. Patent Application Publication No. 2013/0063047, published Mar. 14, 2013, both entitled LOAD CONTROL DEVICE FOR A LIGHT-EMITTING DIODE LIGHT SOURCE, the entire disclosures of which are hereby incorporated by reference in their entirety.

As the electrical infrastructure changes to accommodate renewable energy sources (e.g., wind power, photovoltaic solar power, fuel cells, etc.), it is likely that there will be a movement towards direct current (DC) power distribution as this is the native version of generation for many of these technologies. For example, photovoltaic solar arrays generate DC power and often this is directly stored in batteries. From there, power may be drawn directly from the battery bank as direct current (DC), or it may be inverted to alternating current for use by appliances. With this anticipated move to a DC power bank, it would be desirable to use power directly as DC power rather than convert it to AC power. Many AC electrical loads actually require DC power to function and traditionally require rectification to render the AC power useful to the electrical load. Many AC electrical loads also employ active power factor correction (PFC) so as to minimize production of unwanted harmonics on the AC mains. However, the rectification and active power factor correction operations introduce an efficiency loss.

Finally, existing electrical panels (e.g., lighting panels) typically include only a minimum amount of hardware for controlling the operation of the electrical load, with most, if not all, of the power conversion and load control functionality residing remote from the panel at the electrical load. For example, electrical panels typically provide AC mains voltage to attached electrical loads, and the electrical loads typically include the required processors, converters, and controls necessary to convert the received AC mains voltage into appropriate driving voltages for the electrical loads. For instance, typical light fixtures include not only the light emitting elements themselves, but also the hardware and software (e.g., LED driver, ballast, etc.) required to convert the received AC mains voltage into a driving voltage for the lighting load. This tends to result in expensive and bulky lighting fixtures.

SUMMARY

Systems and methods described herein provide examples of a load control system that includes an electrical panel (e.g., a modular electrical panel), where the electrical panel is configured to control a plurality of electrical loads. The electrical panel may include a control circuit, memory, and a communication circuit. The electrical panel may include one or more of an alternating current (AC) line feed, a direct current (DC) line feed, or a battery bank feed. The AC line feed may be connected to an AC power source, while the DC line feed may be connected to a DC power source (e.g., one or more alternative energy devices, such as, but not limited to: a photovoltaic (PV) system, a wind turbine system, a hydroelectric system, etc.), and the battery bank feed may be connected to a bank of batteries. The electrical panel may be, for example, a lighting panel, and the plurality of electrical loads may include at least lighting loads (e.g., LED light engines). The electrical panel may be, for example, a shading panel, and the plurality of electrical loads may include at least motorized window treatments.

The electrical panel may also include a plurality of power supplies and a plurality of control modules, where more than one control module may be associated with each of the plurality of power supplies. Each power supply may be configured to receive AC power and provide DC power, while one or more of the power supplies may also be configured to receive DC input and output a converted version of the received DC power. Each control module may be configured to receive DC power from an associated power supply and provide an output voltage to at least one electrical load. The control module may provide an output voltage that is regulated to provide power for operation and control of an associated electrical load, or the control module may provide an output voltage that is then received by an accessory module at the electrical load, where the accessory module performs the final stages of regulation and/or control for powering the electrical load. As such, the electrical panel provides flexibility as to whether each stage of conversion, regulation, and/or control is performed at a control module located within the electrical panel, or performed at an accessory module located at an electrical load.

The electrical panel may be configured to provide DC power from the battery bank feed to at least one electrical load during an emergency situation, for example, thereby eliminating the need for local and/or dedicated batteries to be located at the electrical load for emergency power. The electrical panel may further comprise a grid-tie inverter, which may provide for an electrical connection from the DC line feed (e.g., and in turn a DC power source) to the AC line feed (e.g., and in turn an AC electrical grid). As such, the control circuit of the electrical panel may be configured to feed DC power to an electrical grid via the AC line feed. Further, the control circuit may be configured to determine whether to provide, to at least one power supply, AC power from the AC line feed or DC power from the DC line feed, for example, based on one or more factors described herein (e.g., time-of-day pricing of AC power from the electrical grid).

One or more of the power supplies may be multi-feed power supplies. For example, one or more of the power supplies may be configured to operate an electrical load when receiving AC power from the AC line feed using an AC input on the power supply, and configured to operate the electrical load when receiving DC power from the DC line feed using a DC input on the power supply. Control modules may be configured to output different Classes of power (e.g., Low Voltage Class 2, Low Voltage Class 1, High Voltage Class 1, etc.). For example, a first control module may be configured to output a first Class of power, and a second control module may be configured to output a second Class of power, the second Class being different from the first Class. Further, one or more of the power supplies may be configured to determine whether they are operating a Low Power Class 2 power supply, a Low Power Class 1 power supply, or a High Power Class 1 power supply, based on one or more of a measured current on a link to the electrical load, a measured voltage on a link to the electrical load, a measured power on a link to the electrical load, or feedback from the electrical load.

One or more of the control modules may be configured to provide DC power and communications over a two-wire link to an electrical load. For example, a control module may be configured to provide communications by injecting a timing window within a DC voltage, the timing window being characterized by one of four offsets, where each offset corresponds to a different data transmission (e.g., "00", "01", "10", or "11").

DETAILED DESCRIPTION

Figure 1:
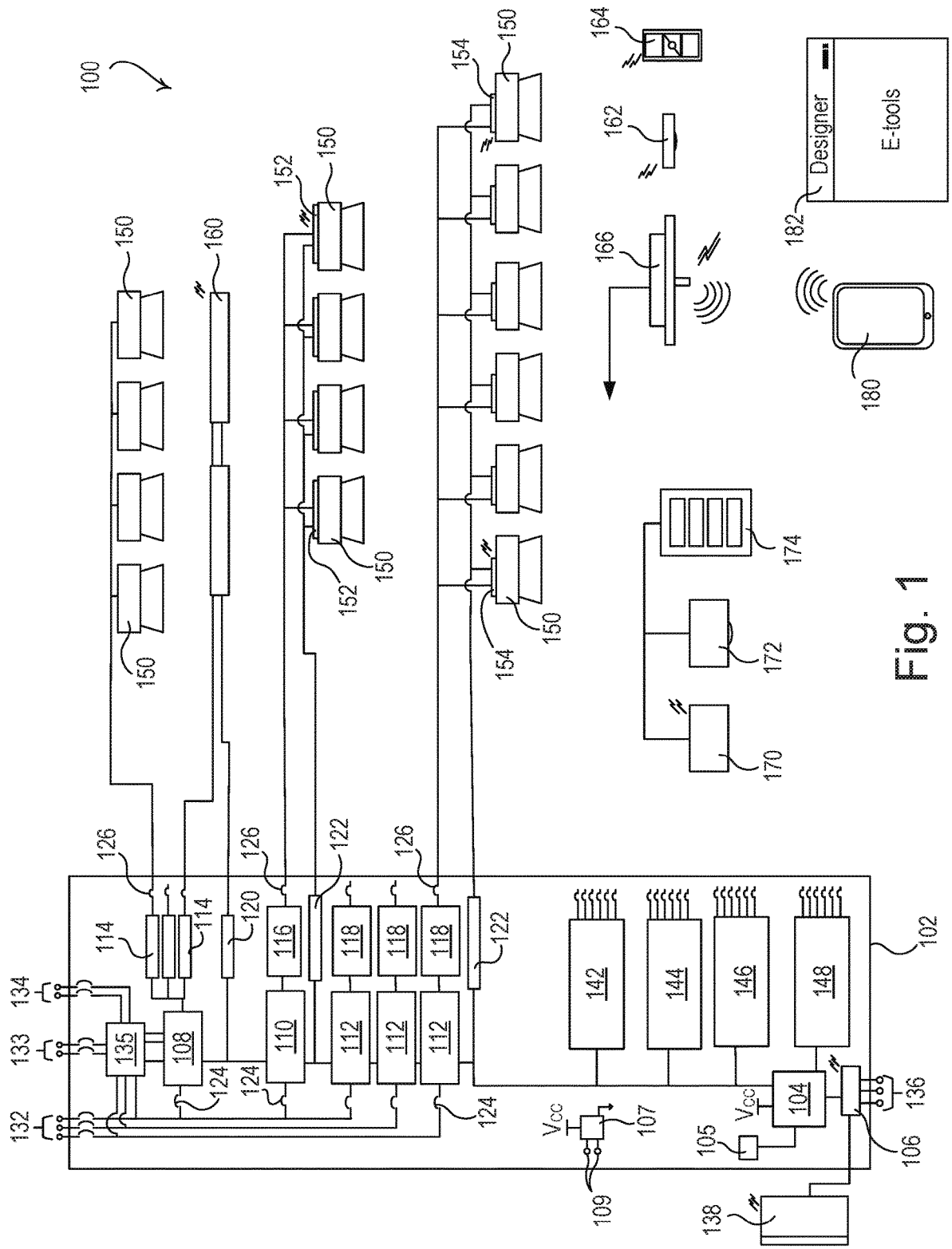
FIG. 1 is a simplified block diagram of an example load control system.

FIG. 1 is a simplified block diagram of an example load control system 100. The load control system 100 may comprise an electrical panel (e.g., a lighting panel 102) and one or more electrical loads. The lighting panel 102 may include a panel control circuit 104 (e.g., a panel controller), memory 105, a communication circuit 106, a lighting panel power supply 107, one or more power supplies (e.g., AC/DC power converters), and one or more control modules. The electrical loads may include one or more lighting loads, such as, but not limited to, LED light engines 150 and one or more motorized window treatments 160. Accordingly, the lighting panel 102 may provide power and control for a plurality of different types of electrical loads.

The lighting panel 102 may control the amount of power delivered to an electrical load, such as an LED light engine 150, and thus the intensity of the light engine. An LED light engine 150 may include a single LED or a plurality of LEDs connected in series, in parallel, or in a suitable combination thereof, depending on the particular lighting system. An LED light engine 150 may comprise one or more organic light-emitting diodes (OLEDs). The LED light engine 150 may also include a resistor and/or low dropout regulator (LDR) that regulates/offsets the current through the LEDs.

The motorized window treatments 160 may each comprise, for example, a cellular shade, a roller shade, a drapery, a Roman shade, a Venetian blind, a Persian blind, a pleated blind, a tensioned roller shade system, or other suitable motorized window covering. The motorized window treatments 160 may each comprise a motor drive unit (not shown) for adjusting the position of a covering material of the motorized window treatment 160, for example, to control the amount of daylight entering the space. The motor drive unit of each motorized window treatment 160 may be configured to receive digital messages via wired or wireless signals and to control the amount of daylight entering the space in response to the received digital messages. The motorized window treatments 160 may each have an antenna mounted for receiving radio frequency (RF) signals. The motor drive unit of each motorized window treatment 160 may receive power from an external DC power supply.

The lighting panel 102 may include input terminals for an AC line feed 132, a DC line feed 134, and/or a battery bank feed 133 providing power to the lighting panel 102. For example, the lighting panel 102 may receive power from the AC line feed 132 that may provide a three-phase AC mains input voltage from an AC power source (not shown). The AC line feed 132 may receive the AC input voltage via a main breaker or directly from the grid. Alternatively, or additionally, the lighting panel 102 may receive power from the DC line feed 134 and/or the battery bank feed 133 that may provide a DC input voltage from a DC power source (not shown). For example, the DC power source may include one or more alternative energy devices, such as, but not limited to: a photovoltaic (PV) system, a wind turbine system, a hydroelectric system, etc. The DC power source may also include a battery bank. If the lighting panel 102 is connected to both an AC power source and a DC power source, the panel control circuit 104 may be configured to determine how much power to receive (i.e., draw) from the AC power supply, and how much power to receive from the DC power supply, based on one or more factors (e.g., variables), such as time-of-day pricing (e.g., of the AC power supply), availability of power from either supply, external conditions (e.g., environmental conditions, price index, time of day, etc.), and/or the like.

The lighting panel 102 may include a portion or the entirety of each of a plurality of load control devices (e.g., where a load control device may include a combination of a power supply and a control module). In instances where the lighting panel 102 includes a portion of a load control device, the remaining portions may reside remote from the lighting panel 102 (e.g., at the electrical load). For example, the lighting panel 102 may include various parts or stages of an LED driver used to control an LED light engine. The lighting panel 102 may include one or more LED drivers in their entirety and/or one or more varying portions of other LED drivers. As such, the lighting panel 102 may be modular and include select stages of power conversion and control (e.g., dimming control) in the lighting panel 102 itself for each of a plurality of electrical loads and electrical load types. For example, expensive and/or complicated control techniques (e.g., power conversion techniques aimed at reducing switching loss) may be implemented in the lighting panel 102 to reduce the costs and/or complexity of the individual light fixtures (and in turn the entire light control system 100). The lighting panel 102 may output DC power to at least some of the connected electrical loads, and as such, provide for DC power distribution (e.g., versus AC power distribution) from the panel to the loads. The example lighting panel 102 of FIG. 1 is just one of many configurations that may be taken by the lighting panel 102.

The lighting panel 102 may include one or more power supplies and one or more control modules. The power supplies may perform power conversion (e.g., from an AC input to a DC output) and/or power factor correction (PFC) to adjust the power factor towards a power factor of one. For example, the power supplies may each include an AC/DC converter and a PFC circuit. The AC/DC converter may be in the form of a rectifier circuit. Alternatively, the power supply may not include an AC/DC converter (e.g., a rectifier circuit), for example, if the power supply is connected to the DC line feed 134 and not the AC line feed 132. The PFC circuit may include a boost converter, a buck converter, a buck-boost converter, a flyback converter, a linear regulator, or a combination of a switching regulator and a linear regulator. The boost converter of the power supply may receive a rectified voltage $V_{RECT}$ and generate a boosted DC bus voltage $V_{BUS}$ across a bus capacitor $C_{BUS}$ (e.g., an electrolytic capacitor). The power supply may provide the DC bus voltage $V_{BUS}$ to one or more control modules. The power supply and the control modules may also communicate with one another over the DC bus (e.g., in accordance with the communication protocol described with reference to FIG. 4). A power supply may include a dedicated control circuit or be entirely controlled by the panel control circuit 104 of the lighting panel 102.

The lighting panel 102 may include a plurality of different power supplies that output a plurality of different power-limited DC bus voltages $V_{BUS}$ (e.g., 100 W limited, 500 W limited, 750 W limited, 4,500 W limited, and/or the like). The power supplies may include their own control circuit (e.g., microprocessor, an application-specific integrated circuit (ASIC), or analog IC) and/or use the panel control circuit 104 of the lighting panel 102. Further, the power supplies may include a radio-frequency interference (RFI) filter circuit that minimizes RF noise on the AC mains or the DC mains. The power supplies may also include snubbing circuits that reduce switching losses of the AC/DC converters, such as lossless snubbers. Further, when not in use, the power supplies may reside in a sleep state (e.g., when the power supply comprises its own control circuit) or a complete off state (e.g., when the power supply does not include its own control circuit and uses the panel control circuit 104 of the lighting panel 102).

The lighting panel 102 may, for example, include AC/DC power supplies, such as an AC/DC power supply 108, an AC/DC power converter 110, and/or an AC/DC power converter 112. The AC/DC power supplies may receive AC line voltage from the AC line feed 132. The AC/DC power supplies may output DC power (e.g., the DC bus voltage $V_{BUS}$) to one or more control modules. Further, the AC/DC power supplies may receive one or more control signals from the panel control circuit 104 and/or from one or more input devices for controlling the operation and output voltages of the AC/DC power supplies (e.g., via internal control circuits of the power supplies). The AC/DC power supplies may also send command signals (e.g., wired or wireless control signals) to one or more control modules or electrical loads for controlling operational characteristics (e.g., pulse-width modulated (PWM) duty cycle, intensity, color, temperature, fade rate, etc.) of the control modules or the electrical loads. Further, the AC/DC power supplies may send feedback signals to the panel control circuit 104 relating to the operation of the power supplies themselves, and/or the control modules or the electrical loads.

The power supplies may be rated for any electrical class, for example, Class 1 or Class 2 power supplies. For example, the AC/DC power supply 108 may be a Class 2 power supply that receives 100-277 VAC and outputs 24V/48V DC. Class 2 power supplies may, for example, be limited to 60V DC and 100 W. The AC/DC converters 110 may be a Low Voltage Class 1 power supply (e.g., limited to 15 A, 60V, and 750 W), while the AC/DC converter 112 may be a High Voltage Class 1 power supply (e.g., limited to 10 A, 450V, and 4,500 W). The AC/DC converter 110 may receive 100-277 VAC, perform power factor correction via a PFC circuit (e.g., a boost converter or flyback converter), and output 24V/48V DC. The power supplies of the lighting panel 102 are not limited to Class 1 and Class 2 power supplies, but may also be rated as other UL or IEC classifications as required by particular local regulations. Additionally, the lighting panel system 102 may provide power and control signals to motorized shading equipment, such as motorized window treatments 160.

The power supplies and/or the panel control circuit 104 of the lighting panel 102 may be configured to determine the rated class type of a power supply (e.g., Low Voltage Class 2, Low Voltage Class 1, High Voltage Class 1, etc.). The determination may be made, for example, based on the control modules and/or electrical loads that are connected to the power supply, and in turn, the desired operational characteristics of the power supply. For example, the power supply (e.g., or the panel control circuit 104) may be configured to measure the amount of current, voltage, and/or power requested on the link, e.g., at the output terminals of the power supply, to determine its desired class type. Alternatively or additionally, a control module and/or electrical load (e.g., an accessory module located at the electrical load) may communicate (e.g., by transmitting a message) to the power supply and/or panel control circuit 104 indicating its power requirements, such as an amount of power needed, type of dimming required, etc. The power supply may then be configured (e.g., by the panel control circuit 104) to control (e.g., limit) its output power accordingly (e.g., operate as a Low Voltage Class 2 power supply, a Low Voltage Class 1 power supply, a High Voltage Class 1 power supply, etc.). The power supply may also be configured to provide an alert and/or report back to the panel control circuit 104 upon determining its class type. Further, the panel control circuit 104 may be configured to adjust the class type of a power supply after installation. For example, a power supply may be initially configured to operate as a Class 1 power supply (e.g., a High Voltage Class 1 power supply), and later be configured (e.g., by the panel control circuit 104) to operate as another class of power supply (e.g., as a Low Voltage Class 2 power supply provided that the proper compliance with the relevant standards exists).

Although described with reference to AC/DC power supplies, the lighting panel 102 may include DC power converters that receive direct DC voltage from the DC line feed 134 and output 24V/48V DC, for example. Further, one or more of the power supplies may be configured to receive an AC input and a DC input, for example, such that the power supply is configured to operate in an AC mode when the input voltage is an AC voltage and in a DC mode when the input voltage is a DC voltage. An example of a power supply that is configured to operate in an AC mode and a DC mode is described herein.

The lighting panel 102 may comprise a plurality of control modules for every power supply (e.g., the AC/DC power supply 108, the AC/DC power converter 110, and/or the AC/DC power converter 112). The lighting panel 102 may also include physical and/or electrical circuit protection that may be located before the power supply, such as breakers 124, and/or after the control module, such as breakers 126. Additionally, output breakers may be configured as electronic breakers whose operating characteristics are adjusted via panel control circuit 104 or a separate control circuit. A plurality of different types of control modules may be connected to a single power supply, and each control module may be individually controllable (e.g., by the power supply and/or the panel control circuit 104). Further, the power supply and/or the panel control circuit 104 may address each control module uniquely, for example, depending on the functions performed by that control module (e.g., color changing, emergency, zoning, etc.). Additionally, the control modules may communicate information back to the power supply and/or the panel control circuit 104. For example, the control modules may receive approval from the power supply before fully powering on its electrical load (e.g., to prevent overloading the power supply or exceeding the regulatory requirement for the particular class installation).

The lighting panel 102 comprises a plurality of types of control modules including, for example, control modules for driving LED light engines 150, control modules for driving a motorized window treatment 160, and control modules for providing digital communication to an electrical load. The control modules may receive DC power from a power supply and provide controlled power to the electrical load (e.g., power to a LED light engine 150, power to a motorized window treatments 160, power to an accessory module remote from the lighting panel 102, and/or the like). A control module may output the proper power for operation and control of an electrical load, such as the driver module 114, or the control module may operate in tandem with an accessory module located at the electrical load (e.g., an isolated low voltage converter 116 in combination with an accessory module 152, or a fault detect and branch circuit 118 in combination with an accessory module 154), such that the two in combination provide the proper power for operation and control of the electrical load. As such, the lighting panel 102 provides for a modular architecture that allows for select functionality to be performed within the lighting panel 102 and other functionality to be performed at the accessory module located at the electrical load.

In additional to modularity, efficiency gains may be realized through use of the lighting panel 102. For example, the control module in the lighting panel may output high voltage (e.g., 450V) to an electrical load, which may be more efficient than distribution at lower voltages (e.g., 277V). Further, in instances where the output of the control module in the lighting panel 102 is lower than typical line voltage (e.g., Class 2 scenarios, such as the output of the driver module 114), the power loss at the electrical load may be reduced, the load may run cooler and in turn last longer, and the electrical loads may not require as much hardware/software located at the load itself, resulting in the load being smaller and more lightweight. If the power supply receives DC input, the design of the power supply and/or control modules may be simplified (e.g., without PFC-related circuitry), and end-to-end efficiency may be enhanced. Moreover, having a centrally located lighting panel 102 within a facility makes maintenance and service easier.

The control modules may output controlled DC power or controlled AC power, depending on the configuration. The control modules may control the output power in accordance with a received command signal from a control circuit (e.g., such as the panel control circuit 104), a connected power supply, a wireless control signal received from an input device, and/or feedback from the electrical load (e.g., temperature, light output, power, color, etc.). The control modules may also provide feedback data to the power supply and/or the panel control circuit 104 of the lighting panel 102 (e.g., feedback data relating to the electrical load, the input power of the control module, intensity level of a connected light source, load failure conditions, sensor statuses, lumen levels, etc.). A control module may include a dedicated control circuit, or may be controlled by the panel control circuit 104 of the lighting panel 102 and/or a control circuit of the associated power supply.

One example control module is the driver module 114. The driver module 114 receives a DC bus voltage $V_{BUS}$ from the AC/DC power supply 108, and provides a regulated DC voltage (e.g., a PWM DC voltage, a constant voltage DC signal, or a DC level with an imposed communication signal etc.) to the LED light engine 150. For example, the driver module 114 may include a load regulation circuit that receives the bus voltage $V_{BUS}$ and controls the amount of power delivered to the LED light engine 150, for example, to control the intensity of the LED light engine 150 between a low-end (i.e., minimum) intensity $L_{LE}$ (e.g., approximately 0.1-5%) and a high-end (i.e., maximum) intensity $L_{HE}$ (e.g., approximately 100%). The driver module 114 may also include additional circuitry, such as a current sense circuit and/or a voltage sense circuit. Since the driver module 114 provides a regulated voltage to the LED light engine 150, the LED light engine 150 that is connected to the driver module 114 may include a minimum amount of hardware and/or software, thereby reducing the cost, size, and complexity of the fixture. For example, the LED light engine 150 may include (e.g., only include) a single LED or a plurality of LEDs, a resistor, and a low drop-out (LDO) regulator that regulates the current through the LEDs.

In other examples, some or all of the functionality of the driver module 114 may be split between a control module located in the lighting panel 102 (e.g., the isolated low voltage converter 116, the fault detect and branch circuit 118, or the like) and an accessory module located at the electrical load (e.g., the accessory modules 152 and 154). As such, the lighting panel 102 provides for a modular design where an electrical load (e.g., LED light engine 150) may include a varying degree of regulation circuitry, while the remaining portions may reside within a control module located within the lighting panel 102 itself. Additionally, and although not illustrated, the lighting panel 102 may include a power supply and the electrical load may include the entirety of the control module (e.g., within the same housing/fixture). For example, the lighting panel may include the AC/DC power supply 108, and the voltage driver module 114 may be implemented as an accessory module located at the LED light engine 150 (e.g., within the same housing/fixture).

Further, such modularity of control modules allows for both Class 1 and Class 2 configurations of electrical loads. For example, together, the isolated low voltage converter 116 and the accessory module 152 may include all of the functionality of a LED driver module (e.g., the driver module 114). The isolated low voltage converter 116 may, for example, include an isolated converter (e.g., a transformer) and a current sense circuit, and the accessory module 152 may include back end regulation at the LED light source 150. As such, the isolated low voltage converter 116 may output voltage in accordance with Low Voltage Class 2 requirements. As another example, the fault detect and branch circuit 118 may include fault detection and regulation circuits, and the accessory module 154 may include the converter. In such a configuration, the fault detect and branch circuit 118 may output voltage in accordance with High Voltage Class 1 requirements (e.g., 450V). These are just two non-limiting examples of how a control module (e.g., the driver module 114) may be split between a control module located within the lighting panel 102 and an accessory module located at the electrical load.

The lighting panel 102 may also include one or more control modules for providing digital communication to an electrical load (e.g., communication modules). For example, the lighting panel 102 may include one or more device control modules 120 and/or accessory communication modules 122. The device control module 120 may provide communication over a dedicated communication line to one or more electrical loads (e.g., motorized window treatments 160) to control operational characteristics of the electrical load (e.g., raise, lower, zoning information, unique identifier, etc.). A sensor/keypad module 170 may receive wired or wireless digital signals from sensors and/or keypads, and the sensor/keypad module 170 may send digital commands to the device control module 120 (e.g., via the communication circuit 106) to control the electrical loads. The accessory communication module 122 may provide communication over a dedicated communication line to one or more electrical loads (e.g., LED light engines 150) to control operational characteristics of the electrical load (e.g., intensity, color, temperature, fade rate, zoning information, unique identifier, etc.). The accessory communication module 122 may receive digital commands via the communication circuit 106.

The lighting panel 102 (e.g., the panel control circuit 104, a power supply, and/or a control module) may provide both data and power to an electrical load, such as an LED light engine 150 or accessory module 152,154, using a single line (e.g., two wires). The electrical load may be uniquely addressed such that individualized control of and/or communication with the electrical load may be performed. For example, the lighting panel 102 may perform a form of power line communication (PLC) when providing DC power to the electrical load, and/or perform modulate a DC voltage to provide communication when powering an electrical load with DC power. An example form of DC power and communication that may be provided over two wires is provided in FIG. 4, which for example, may be used when the power supply is operating as a Class 2 power supply (e.g., AC/DC power supply 108 and the voltage driver module 114). Alternately, the PLC communication over the DC power wires may use techniques such as current carrier signals or high frequency modulated signals to communicate digital information between the lighting loads and the communication circuit 104.

The lighting panel 102 may also include additional control modules and/or power supplies. For example, the lighting panel 102 may include a 0-10V dimming module 142 that provides 0-10V dimming commands to one or more line voltage electrical loads. The lighting panel 102 may also include a phase adaptive module 144 used to provide phase controlled AC voltage to one or more voltage loads (e.g., incandescent lamps or phase-dimmable LED lamps). Further, the lighting panel 102 may include a switching module 146 that may provide traditional on/off switching control for one or more electrical loads. Finally, the lighting panel 102 may include a shade power supply module 148 that may provide power and zoning to multiple motorized window treatments 160 (not illustrated).

The panel control circuit 104 may be configured to control the operation of the power supplies and or control modules to selective provide power drawn from the AC line feed 132, from the DC line feed 134, and/or from the battery bank feed 133. For example, the lighting panel 102 may include a switching circuit configured to switch between directing AC power or DC power to one or more power supplies, the power supplies themselves may receive both AC power and DC power and be configured to switch between the use of AC power or DC power, or the grid-tie inverter 135 may be configured to direct AC power or DC power to one or more power supplies, for example, based on one or more factors described herein. For example, in each instance, the control circuit 104 may control the switching between the use of AC power or DC power by the one or more power supplies. This allows the lighting panel 102 to selectively use power from a particular source based on a variety of conditions, such as, but not limited to, during AC mains power failure, during times of peak demand reduction, when substantial alternate power is available from a PV array, etc. Additionally, this selective direction of power to the electrical loads may be used to accomplish the requirements of emergency power sourcing to particular lighting loads as required by certain national building codes. This system is advantageous in managing the source of emergency power in that is configurable after the installation of the system rather than requiring fixture outfitting with emergency power during the design and installation phase of a project. In addition to controlling the switch between the use of AC power or DC power by a power supply, the control circuit 104 may control one or more characteristics of the electrical loads (e.g., the intensity level of an LED light engine 150) based on whether a power supply is receiving AC power or DC power. For example, the control circuit 104 may lower the intensity (e.g., high-end intensity) of one or more lighting load when using DC power (e.g., only DC power).

The panel control circuit 104 may be configured to control the operation of the power supplies and/or the control modules, for example, in response to a user command received via one or more input devices. For example, if a power supply and/or control module includes a dedicated control circuit, then the panel control circuit 104 may manage the operation of the control circuit of the power supply and/or the control module, and the control circuit of the power supply may control the internal operation of the power supply and/or associated control module(s) (e.g., and when configured, the control circuit of the control module may control the internal operation of the control module). If, however, the power supply does not include a dedicated control circuit, then the panel control circuit 104 may control the internal operation of the power supply and/or associated control module(s). The panel control circuit 104 may comprise, for example, a digital controller or any other suitable processing device, such as, for example, a microcontroller, a programmable logic device (PLD), a microprocessor, an application specific integrated circuit (ASIC), or a field-programmable gate array (FPGA).

The panel control circuit 104 may comprise and/or be coupled to memory 105. The memory 105 may include one or more components of volatile and/or non-volatile memory, in any combination. The memory 105 may store operational characteristics of the components of the lighting panel 102. The lighting panel power supply 107 may generate a direct-current (DC) supply voltage $V_{CC}$ for powering the panel control circuit 104 and the other low-voltage circuitry of the lighting panel 102. The lighting panel power supply 107 may be coupled to the AC line feed 132, the DC line feed 134, the battery bank feed 133, and/or a power supply (e.g., AC/DC power supply 108, 110, 112) via the electrical connections 109. The panel control circuit 104 may be connected to and configured to control any combination of components (e.g., all components) of the lighting panel 102.

The communication circuit 106 of the lighting panel 102 may be coupled to a gateway device 138 and/or one or more data terminals 136, which for example, may include a network link (e.g., Ethernet port), a digital communication link, a Digital Multiplex (DMX) link, etc. The communication circuit 106 may be configured to communicate via a wireless communication link, such as a radio-frequency (RF) communication link or an infrared (IR) communication link.

The load control system 100 may comprise one or more input devices, such that the lighting panel 102 is configured to receive user inputs, transmit digital messages, and/or receive digital messages via the input devices. The digital messages may be transmitted via wired (e.g., through a wired communication link) or wireless signals (e.g., the RF signals). For example, the input devices may include one or more of an access point or hub 166, a wireless sensor 162 (e.g., an occupancy/vacancy sensor, a daylight sensor, etc.), a wireless keypad 164 (e.g., a battery-powered handheld remote control device), a sensor/keypad module 170, a wired sensor 172 (e.g., an occupancy/vacancy sensor, a daylight sensor, etc.), a visual display remote control device 174 (e.g., a dynamic keypad), a wireless mobile device 180, a web interface 182, a wall-mounted remote control device (not shown), etc. The access point or hub 166 may be configured to transmit and receive wired and wireless signals, and may include a network connection to the lighting panel 102 (e.g., the panel control circuit 104 and/or the communication circuit 106) and may act as a standard protocol (e.g., Wi-Fi) access point and/or a proprietary protocol (e.g., the ClearConnect® protocol) access point for one or more input devices and/or electrical loads. The sensor/keypad module 170 may include a QS link to one or more wire devices, such as the wired sensor 172 and the visual display remote control device 174, and may be configured to communicate wirelessly using a proprietary protocol (e.g., the ClearConnect® protocol).

The digital messages may include information such as a command, a query, and/or identifying information. For example, the digital messages transmitted by the input device may include a unique identifier (e.g., a serial number) associated with the transmitting input device. The wireless signals carrying the digital messages may be transmitted at a certain communication frequency or frequency range $f_{RF}$ (e.g., approximately 434 MHz, 900 MHz, 2.4 GHz, or 5.6 GHz). The transmission may utilize a proprietary communication protocol, such as the ClearConnect® protocol, Wi-Fi, Bluetooth®, ZIGBEE, Z-WAVE, KNX-RF, ENOCEAN RADIO, and/or a different proprietary protocol.

The input devices may be assigned to one or more components of the load control system 100 (e.g., the lighting panel 102, the panel control circuit 104, a power supply (e.g., AC/DC power supply 108, an AC/DC power converter 110, and/or an AC/DC power converter 112), a control module (e.g., control module 114, 116, or 118, communication module 120 or 122), an accessory module (e.g., the accessory module 152 or 154), and/or a motorized window treatment 160) during a configuration procedure of the load control system 100, such that the load control system, e.g., the lighting panel 102, may be responsive to digital messages transmitted by the input devices. Examples of methods of associating control devices are described in greater detail in commonly-assigned U.S. Patent Application Publication No. 2008/0111491, published May 15, 2008, entitled RADIO-FREQUENCY LIGHTING CONTROL SYSTEM; U.S. Patent Application Publication No. 2013/0214609, published Aug. 22, 2013, entitled TWO-PART LOAD CONTROL SYSTEM MOUNTABLE TO A SINGLE ELECTRICAL WALLBOX; and U.S. patent application Ser. No. 13/830,237, filed Mar. 14, 2013, entitled COMMISSIONING LOAD CONTROL SYSTEMS; the entire disclosures of which are hereby incorporated by reference.

The communication circuit 106 of the lighting panel 102 may be connected to the gateway device 138 (e.g., a bridge) and may be configured to enable communication with a network, such as a wireless network and/or wired local area network (LAN). The gateway device 138 may be connected to a router (not shown) via a wired digital communication link (e.g., an Ethernet communication link). The router may allow for communication with the network, e.g., for access to the Internet. The gateway device 138 may be wirelessly connected to the network, e.g., using Wi-Fi technology. The gateway device 138 may be configured to transmit the RF signals to one or more components of the lighting panel 102 and/or an accessory module for controlling the respective electrical loads in response to digital messages received from external devices via the network. The transmission may use a proprietary protocol described herein. The gateway device 138 may be configured to receive digital messages from the accessory modules of the load control system 100 (e.g., via the RF signals and/or using a proprietary protocol). The gateway device 138 may be configured to transmit digital messages via the network for providing data (e.g., status information) to external devices. The gateway device 138 may operate as a central controller for the lighting panel 102, or may relay digital messages between the accessory modules of the load control system 100 and the network. For example, feedback and/or reports may be received (e.g., by the panel control circuit 104) from the accessory modules of the load control system 100 and sent over the network (e.g., via the gateway device 138) to a user.

The lighting panel 102 may be in communication with a system administration (e.g., a system administrator server) via the gateway device 138. For example, the panel control circuit 104 may be configured to provide a report relating to the operation and/or configuration of the lighting panel 102 and/or other components of the lighting control system 100 to the system administrator. Further, the system administrator may be able to configure one or more components of the lighting panel 102 and/or other components of the lighting control system 100 from a remote location. A report may include one or more notification, alerts, or summaries relating to a failed component, a reconfigured component (e.g., change of rated class of a power supply), an additional load being connected to the lighting panel 102, operation of the grid-tie inverter, a switch between AC-DC or vice versa, digital messages sent/received within the lighting system 100, demands of the lighting system 100, commissioning of components of the lighting system 100, etc.

The wireless mobile device 180 (e.g., a network device) may include a smart phone (e.g., an iPhone® smart phone, an Android® smart phone, or a Blackberry® smart phone), a personal computer, a laptop, a wireless-capable media device (e.g., MP3 player, gaming device, or television), a tablet device (e.g., an iPad® hand-held computing device), a Wi-Fi or wireless-communication-capable television, or any other suitable Internet-Protocol-enabled device. For example, the wireless mobile device 180 may be configured to transmit RF signals to the gateway device 138 via a Wi-Fi communication link, a Wi-MAX communications link, a Bluetooth® communications link, a near field communication (NFC) link, a cellular communications link, a television white space (TVWS) communication link, or any combination thereof. Examples of lighting systems operable to communicate with wireless mobile devices 180 on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The lighting panel 102 may also include a combination grid-tie inverter/battery charger 135. Alternatively, the lighting panel 102 may not include the grid-tie inverter/battery charger 135 (e.g., the load control system may include a grid-tie inverter external to the lighting panel), and may include a single DC line feed (e.g., the DC line feed 134). With either configuration, a connection may be provided for tying the lighting panel 102 back to the AC power grid so that the lighting panel 102 may feed excess power back to the grid (e.g., via the AC line feed 132). For example, the lighting panel 102 may use a portion of the DC power that is received from the DC power source (e.g., via the DC line feed 134 and/or via the battery bank feed 133) for powering one or more electrical loads, and sell any remaining DC power back to the grid via the grid-tie inverter 135. The panel control circuit 104 may determine how much DC power to use versus to sell back to the grid based on one or more factors (e.g., environmental conditions, price index of the AC power, time of day, etc.). Further, the panel control circuit 104 may decide to lower the power provided to one or more electrical loads (e.g., dim one or more LED light engines 150) based on the amount of received DC power, potentially within a window of acceptance and/or based on one or more of the factors, such that the lighting panel 102 limits the amount of received AC power (e.g., potentially doesn't receive any AC power).

The lighting panel 102 may be connected to an AC power supply via the AC line feed 132, to a DC power supply via the DC line feed 134, and to a battery bank via the battery bank feed 133. The grid-tie inverter/battery charger 135 of the lighting panel 102 may be connected to a battery bank via the battery bank feed 133 and/or to a DC power source (e.g., an alternative energy source, such as a PV power supply) via the DC line feed 134. The lighting panel 102 may provide power to any one or more of the electrical loads during any emergency situation (e.g., to power one or more LED light engines 150) using energy stored in the battery bank. Therefore, the panel control circuit 104 may configure any of the connected electrical loads to operate as an emergency device (e.g., emergency lighting) during an emergency situation, for example, after installation and without having to connect dedicated batteries to a specific electrical load or to each electrical load. Further, the panel control circuit 104 may be configured to recharge the battery bank via the grid-tie inverter/battery charger 135 using the DC power source and/or the AC power source, for example, such that the battery bank does not need replenishment. Alternatively or additionally, the lighting panel 102 may use DC power received from the DC power supply and/or the battery bank directly to power the electrical loads in emergency situations, for example, with the use of the battery bank or a site based generation facility.

The load control system 100 may be configured (e.g., programmed) through a commissioning procedure. For example, the devices of the load control system 100 (e.g., the control modules of the lighting panel 102, the accessory modules 152, 154, the input devices, etc.) may be associated with one another, for example, through a commissioning procedure. A combination of communication features may be used to create an intuitive and simple way to accomplish the commissioning aspects of an addressable lighting system. The mobile device 180 may be used to commission the load control system 100. For example, the load control system 100 may include a plurality of lighting fixtures (e.g., the LED light engines 150 having accessory modules 152, 154), where each of the lighting fixtures are individually addressable, and as such, the load control system 100 may be installed and configured to the particular application with little regard (e.g., restriction) to the actual wiring structure utilized. The mobile device 180 may be used to perform zoning of fixtures after installation and without having to rewire the load control system 100. For example, the lighting panel 102 may be configured to control (e.g., simultaneously control) a plurality of lighting fixtures that abut a row of windows in a building together to accomplish a daylight harvesting function, even though the lighting fixtures are not wired together. For instance, the lighting panel 102 may store and utilize a unique address to control the behavior of each lighting fixture. Further, the lighting panel 102 may store a database relating the particular behavior of each of the electrical loads in a space for a variety of control inputs. The lighting panel 102 may use the database to determine the relationships and commands for each power supply and control module (e.g., for zoning, daylight harvesting, etc.), and the lighting panel 102 may create the database during the commissioning process.

The lighting panel 102 may perform commissioning in such a manner as to reduce the time and labor typically required to associate multiple electrical loads with one or more controls. For example, the electrical loads (e.g., the LED light fixtures 150) may include a radio beacon (not shown), such as a Bluetooth beacon. Each radio beacon may include a radio transmitter and ultimately provides addressability for an electrical load. In addition, the accessory modules 152, 154 may be configured to transmit a beacon signal. The radio beacon in the electrical load may broadcast a unique identifier of the radio beacon (e.g., serial number) via radio signals that may be received by the mobile device 180. The electrical loads may include a wired or wireless connection back to the lighting panel 102, for example, to a control module (e.g., the driver module 114), communication module 122, and/or communication circuit 106. The lighting panel 102 may create a database relating to how to group electrical loads based on the received signal strength of the broadcast signal (e.g., and in turn, the proximity of the radio beacon to the mobile device 180). The database may be created during the commissioning process and used to determine the behavior for a plurality of loads in a particular space. To create the database, the mobile device 180 may receive and determine a signal strength and unique identifier of a radio beacon. Using the receiving signal strength, the mobile device 180 may group or associated one or more electrical loads together for commissioning purposes in the database. After the association of electrical load and radio beacon is established and stored in the database of the lighting panel 102, the lighting panel 102 may control a group of electrical loads together based on the identification information of each electrical load and/or associated control function, for example, via a wireless or a wired communication channel between lighting panel 102 and the electrical load. Examples of systems that perform commissioning and example commissioning procedures are described in greater detail in commonly-assigned U.S. Provisional Patent Application No. 62/279,409, filed Jan. 15, 2016, and U.S. Provisional Patent Application No. 62/326,466, filed Apr. 22, 2016, both entitled COMMISSIONING LOAD CONTROL SYSTEMS, the entire disclosures of which are hereby incorporated by reference.

The lighting panel 102 may include additional power supplies (e.g., N+1 power supplies) of a particular type, such as the AC/DC power supplies 108, the AC/DC power converters 110, and/or the AC/DC power converters 112. Further, the lighting panel 102 may include additional control modules (e.g., N+1 control modules) of a particular type, such as the driver modules 114, the isolated low voltage converters 116, or the fault detect and branch circuits 118. In such instances, the panel control circuit 104 of the lighting panel 102 may be configured to switch-in (e.g., automatically switch-in) a power supply or control module if a power supply or control module were to fail. For example, the panel control circuit 104 may be configured to detect that a power supply or control module has failed or was in danger of failing, and upon such a determination, the panel control circuit 104 may reroute the circuit through an additional power supply or control module so the failure does not cause an interruption of power (e.g., an extended disruption of power) to the electrical load. As such, the electrical load(s) receiving power from the failed power supply or control module would not lose power for an extended period or not lose power at all, depending on the detection time and/or the switch-in time for the additional power supply or control module. Further, the panel control circuit 104 may be configured to provide a notification, for example, to a system administrator, if a power supply or control module were to fail. Accordingly, the system administrator may replace the failed power supply or control module within the lighting panel 102 without having to take any electrical loads offline.

Figure 2:
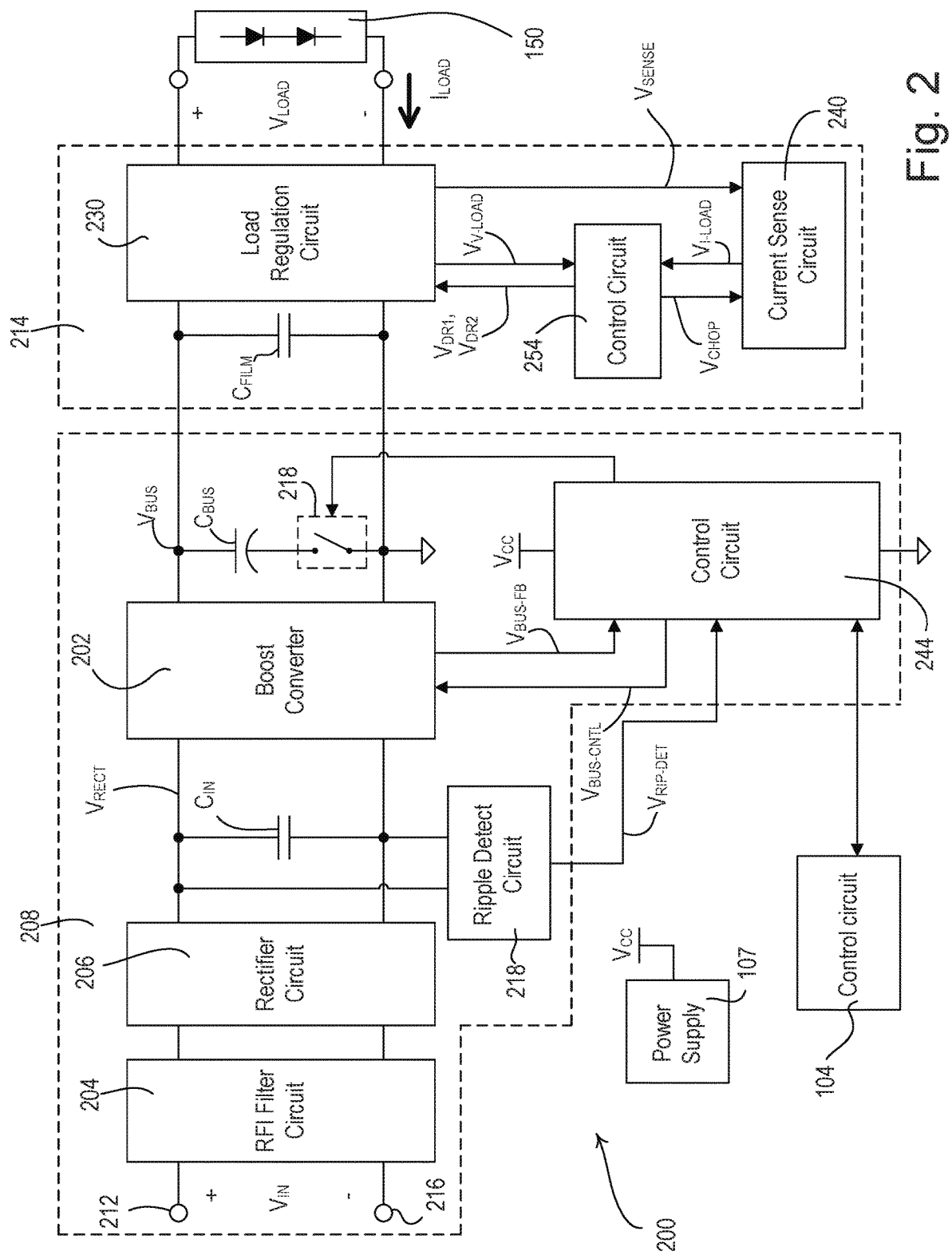
FIG. 2 is a simplified block diagram of an example power supply and control module of the load control system of FIG. 1.

FIG. 2 is a simplified block diagram of a system 200 including an example power supply 208 and an example control module 214 of the load control system of FIG. 1. The power supply 208 is an example of the power supply 108, and the control module 214 is an example of the driver module 114. Also illustrated in the system 200 is the panel control circuit 104 of the lighting panel 102 and power supply 107 of the lighting panel 102, but the specific configuration of these components with respect to the power supply 208 and control module 214 is an example configuration. Further, it should be noted that the power supply 208 may also include memory and a communication circuit, and/or the power supply 208 may include a dedicated internal power supply instead of using the power supply of the lighting panel 107.

The power supply 208 and the control module 214 may be configured to control the amount of power delivered to an electrical load, such as, the LED light engine 150, and thus the intensity of the electrical load. The LED light engine 150 is shown as a plurality of LEDs connected in series but may comprise a single LED or a plurality of LEDs connected in parallel or a suitable combination thereof, depending on the particular lighting system. The power supply 208 may comprise a first input terminal 212 (e.g., a hot terminal) and a second input terminal 216 (e.g., a neutral terminal) that are adapted to be coupled to a power source (not shown), e.g., via the AC line feed 132, the DC line feed 134, and/or the battery bank feed 133. The first and second input terminals 212, 216 may be configured to receive an input voltage $V_{IN}$, e.g., an AC mains input voltage or a DC input voltage. The power supply 208 also includes a power supply control circuit 244, however in some examples, the power supply control circuit 244 may be omitted and, for example, the power supply 208 may be controlled entirely by the panel control circuit 104 of the lighting panel 102.

The power supply 208 may comprise a radio-frequency (RFI) filter circuit 204, a rectifier circuit 206, a boost converter 202, and/or a ripple detect circuit 218. The RFI filter circuit 204 may minimize the noise provided on the AC mains. The rectifier circuit 204 may be a dynamic rectifier circuit configured to change its operation in response to whether an AC voltage or a DC voltage is present at the input terminals 212, 216. The rectifier circuit 206 may be configured to rectify the input voltage $V_{IN}$ to generate a rectified voltage $V_{RECT}$ when the input terminals are connected to an AC power source and an AC voltage is present at the input terminals 212, 216. The rectifier circuit 206 may be configured to pass through the input voltage $V_{IN}$ (e.g., not rectify the input voltage $V_{IN}$) when the input terminals are connected to a DC power source and a DC voltage is present at the input terminals 212, 216 of the power supply 208.

The boost converter 202 may receive the rectified voltage $V_{RECT}$ and generate a boosted DC bus voltage $V_{BUS}$ across a bus capacitor $C_{BUS}$ (e.g., an electrolytic capacitor). The boost converter 202 may comprise any suitable power converter circuit for generating an appropriate bus voltage, such as, for example, a flyback converter, a single-ended primary-inductor converter (SEPIC), a Ćuk converter, or other suitable power converter circuit. The boost converter 202 may operate as a PFC circuit to adjust the power factor of the power supply 208 towards a power factor of one. The power supply 208 may comprise an input capacitor $C_{IN}$ (e.g., a film capacitor) coupled across the input of the boost converter 202. Examples of boost converters are described in greater detail in commonly-assigned U.S. Pat. No. 8,492,987, issued Jul. 23, 2013, and U.S. Pat. No. 8,680,787, issued Mar. 25, 2014, both entitled LOAD CONTROL DEVICE FOR A LIGHT-EMITTING DIODE LIGHT SOURCE, the entire disclosures of which are hereby incorporated by reference.

The control module 214 may comprise a load regulation circuit 230 and/or a current sense circuit 240. The load regulation circuit 230 may receive the bus voltage $V_{BUS}$ and control the amount of power delivered to the LED light engine 150, for example, to control the intensity of the LED light engine 150. An example of the load regulation circuit 230 may be an isolated, half-bridge forward converter. An example of a forward converter is described in greater detail in commonly-assigned U.S. Pat. No. 9,253,829, issued Feb. 2, 2015, entitled LOAD CONTROL DEVICE FOR A LIGHT-EMITTING DIODE LIGHT SOURCE, the entire disclosure of which is hereby incorporated by reference. The load regulation circuit 230 may comprise, for example, a buck converter, a linear regulator, or any suitable LED drive circuit for adjusting the intensity of the LED light engine 150.

The power supply control circuit 244 may be configured to control the operation of the boost converter 202 of the power supply 208. For example, the power supply control circuit 244 may generate a bus voltage control signal $V_{BUS\text{-}CNTL}$, which may be provided to the boost converter 202 for adjusting the magnitude of the bus voltage $V_{BUS}$ towards a target bus voltage $V_{BUS\text{-}TARGET}$. The power supply control circuit 244 may receive a bus voltage feedback control signal $V_{BUS-FB}$ from the boost converter 202, which may indicate the magnitude of the bus voltage $V_{BUS}$.

The control module 214 may comprise a module control circuit 254, which may generate drive control signals $V_{DR1}$, $V_{DR2}$. The drive control signals $V_{DR1}$, $V_{DR2}$ may be provided to the load regulation circuit 230 of the control module 214 for adjusting the magnitude of a load voltage $V_{LOAD}$ generated across the LED light engine 150 and the magnitude of a load current $I_{LOAD}$ conducted through the LED light engine 150, for example, to control the intensity of the LED light engine 150 to a target intensity $L_{TRGT}$. The module control circuit 254 may adjust an operating frequency fop and/or a duty cycle $D_{CINV}$ (e.g., an on time $T_{ON}$) of the drive control signals $V_{DR1}$, $V_{DR2}$ to adjust the magnitude of the load voltage $V_{LOAD}$ and/or the load current $I_{LOAD}$. The module control circuit 254 may receive a load voltage feedback signal $V_{V-LOAD}$ generated by the load regulation circuit 230. The load voltage feedback signal $V_{V-LOAD}$ may indicate the magnitude of the load voltage $V_{LOAD}$. The power supply control circuit 244 of the power supply 208 may operate independently of the module control circuit 254 of the control module 214. In addition, the power supply control circuit 244 may be configured to communicate with the module control circuit 254 to allow the power supply control circuit 244 and the module control circuit 254 to work together to control the operation of the system 200.

The current sense circuit 240 of the control module 214 may receive a sense voltage $V_{SENSE}$ generated by the load regulation circuit 230. The sense voltage $V_{SENSE}$ may indicate the magnitude of the load current $I_{LOAD}$. The current sense circuit 240 may receive a signal-chopper control signal $V_{CHOP}$ from the module control circuit 254. The current sense circuit 240 may generate a load current feedback signal VT-LOAD, which may be a DC voltage indicating the average magnitude $I_{AVE}$ of the load current $I_{LOAD}$. The module control circuit 254 may receive the load current feedback signal VT-LOAD from the current sense circuit 240 and control the drive control signals $V_{DR1}$, $V_{DR2}$ accordingly. For example, the module control circuit 254 may control the drive control signals $V_{DR1}$, $V_{DR2}$ to adjust a magnitude of the load current $I_{LOAD}$ to a target load current $I_{TRGT}$ to thus control the intensity of the LED light engine 150 to the target intensity $L_{TRGT}$ (e.g., using a control loop). The module control circuit 254 may be configured to determine a load power $P_{LOAD}$ presently being consumed by the LED light engine 150 using the load voltage feedback signal $V_{V-LOAD}$ and the load current feedback signal $V_{I-LOAD}$. The load current $I_{LOAD}$ may be the current that is conducted through the LED light engine 150. The target load current $I_{TRGT}$ may be the current that the module control circuit 254 would ideally like to conduct through the LED light engine 150 (e.g., based at least on the load current feedback signal $V_{I-LOAD}$).

The power supply 208 may also comprise a ripple detect circuit 218, which may receive the rectified voltage $V_{RECT}$ and may generate a ripple detect signal $V_{RIP-DET}$ that may indicate whether AC ripple is present or not on the rectified voltage $V_{RECT}$ (e.g., whether an AC voltage or a DC voltage, respectively is coupled to the input terminals 212, 216). The power supply control circuit 244 may receive the ripple detect signal $V_{RIP-DET}$ and may operate in an AC mode if an AC voltage is coupled to the input terminals 212, 216 or a DC mode if a DC voltage is coupled to the input terminals 212, 216. The ripple detect circuit 218 may also be coupled to receive the input voltage $V_{IN}$ and/or the bus voltage $V_{BUS}$.

The power supply 208 may also comprise a controllable switching circuit 218 (e.g., including a MOSFET) electrically coupled in series with the bus capacitor $C_{BUS}$ for disconnecting the bus capacitor. When operating in the AC mode, the power supply control circuit 244 may enable the operation of the boost converter 202 of the power supply 208 to generate the bus voltage $V_{BUS}$ across the bus capacitor $C_{BUS}$. The power supply control circuit 244 may render the controllable switching circuit 218 conductive and may control the magnitude of the bus voltage $V_{BUS}$ to a maximum magnitude $V_{BUS-MAX}$ (e.g., approximately 465 volts). The power supply control circuit 244 may also operate the boost converter 202 as a PFC circuit during the AC mode to adjust the power factor of the power supply 208 towards a power factor of one.

When operating in the DC mode, the power supply control circuit 244 may be configured to disable the operation of the boost converter 202 to reduce the power loss in the power supply 208 due to the power loss in the boost converter when enabled. When disabled, the boost converter 202 may pass through the DC voltage from the input terminals 212, 216 and the bus voltage $V_{BUS}$ may have a minimum magnitude $V_{BUS-MIN}$ (e.g., approximately 380 volts). When operating in the DC mode, the power supply control circuit 244 may be configured to enable the boost converter 202 during a startup routine of the power supply 208 and disable the boost converter 202 during normal operation. Further, the power supply control circuit 244 may render the controllable switching circuit 218 conductive to disconnect the bus capacitor $C_{BUS}$ in the DC mode since the bus capacitor may not be required when the DC voltage is present at the input terminals. Rather than disabling the boost converter 202 in the DC mode, the power supply control circuit 244 may also scale back the operation of the boost converter (e.g., reduce the target bus voltage $V_{BUS-TARGET}$) in order to reduce the losses in the boost converter 202.

The control module 214 may also comprise a capacitor $C_{FILM}$ (e.g., a film capacitor) coupled across the input of the load regulation circuit 230 for supplying high-frequency current that may be required to circulate through the load regulation circuit. Since the bus capacitor $C_{BUS}$ may comprise one or more electrolytic capacitors, disconnecting the bus capacitor $C_{BUS}$ of the power supply 208 may increase the lifetime of the LED driver 100. In addition, disconnecting the bus capacitor $C_{BUS}$ may reduce an inrush current conducted by the power supply 208 when power is applied to the input terminals 212, 216.

The power supply control circuit 244 may also enable the operation of the boost converter 202 in the DC mode when the power $P_{LOAD}$ required by LED light engine 150 exceeds a threshold amount $P_{TH}$ (e.g., approximately 80%). In addition, the power supply control circuit 244 may also be configured to control the target bus voltage $V_{BUS-TARGET}$ as a function of the power $P_{LOAD}$ required by LED light engine 150 (e.g., if the power supply control circuit 244 is configured to communicate with the module control circuit 245 to determine the power $P_{LOAD}$ required by LED light engine 150). The power supply control circuit 244 may be configured to adjust the target bus voltage $V_{BUS-TARGET}$ linearly between the minimum magnitude $V_{BUS-MIN}$ and the maximum magnitude $V_{BUS-MAX}$ when the power $P_{LOAD}$ required by LED light engine 150 is above the threshold amount $P_{TH}$. The power supply control circuit 244 may be configured to control the target bus voltage $V_{BUS-TARGET}$ using open loop control, for example, by using a lookup table to determine the target bus voltage $V_{BUS-TARGET}$ in response to the target intensity $L_{TRGT}$ and/or target load current $I_{TRGT}$. The power supply control circuit 244 may also be configured to control the target bus voltage $V_{BUS-TARGET}$ using closed loop control, for example, by using the load voltage feedback signal $V_{V-LOAD}$ and the load current feedback signal $V_{I-LOAD}$ to determine the power $P_{LOAD}$ required by LED light engine 150. The power supply control circuit 244 could also be configured to learn the target intensity $L_{TRGT}$ and/or target load current $I_{TRGT}$ at which the power $P_{LOAD}$ required by LED light engine 150 exceeds the threshold amount $P_{TH}$ (e.g., during a startup routine).

Figure 3:
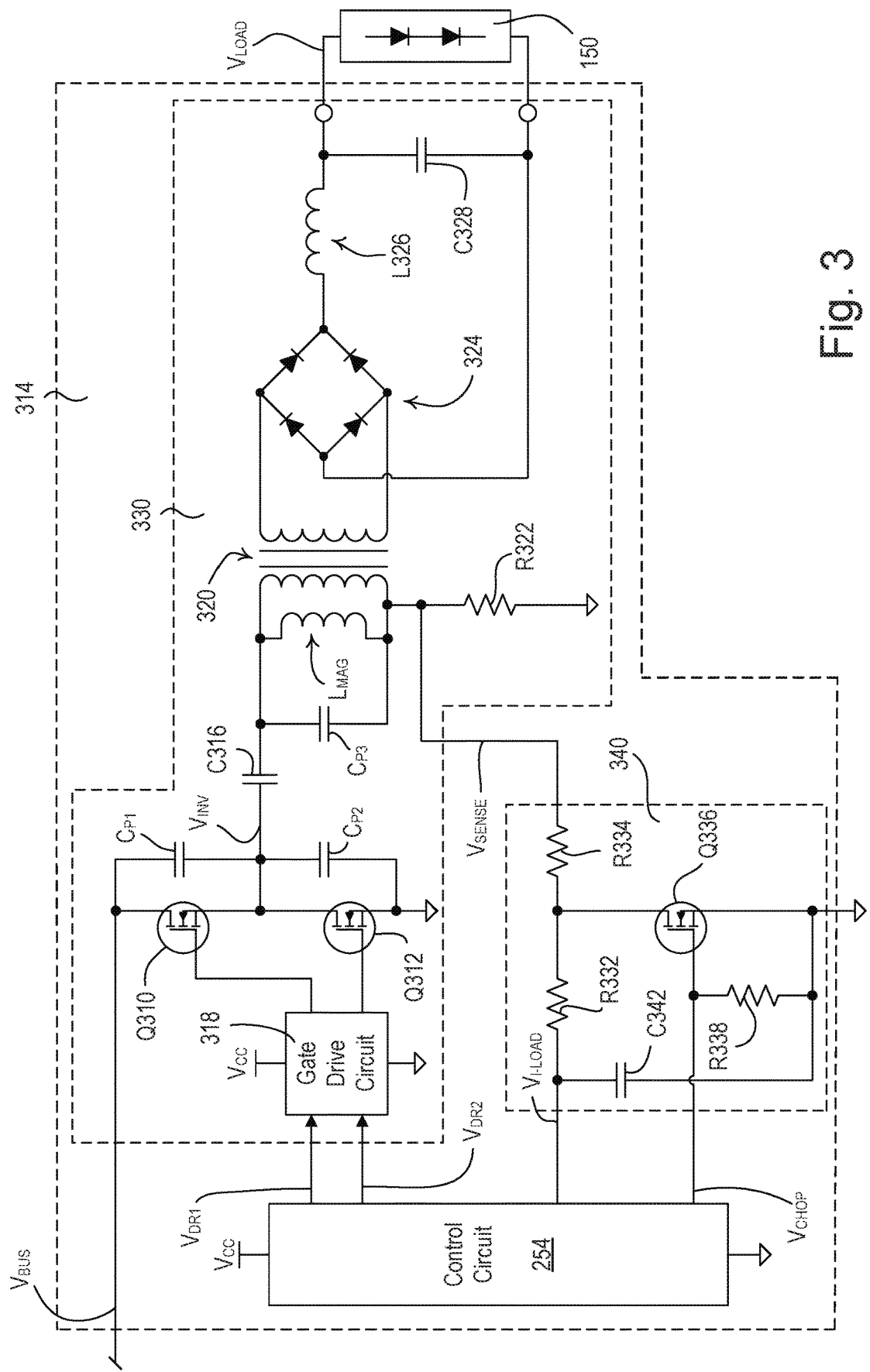
FIG. 3 is a simplified block diagram of an example forward converter and current sense circuit of the control module of FIG. 2.

FIG. 3 is a simplified block diagram of an example load regulation circuit (e.g., a forward converter) and current sense circuit of an example control module 314. The control module 314 may include a forward converter 330 and/or a current sense circuit 340. The control module 314 may be an example of the control module 214, the forward converter 330 may be an example of the load regulation circuit 230 of the control module 214, and the current sense circuit 340 may be an example of the current sense circuit 240 of the control module 214.

The forward converter 330 may comprise a half-bridge inverter circuit having two field effect transistors (FETs) Q310, Q312 for generating a high-frequency inverter voltage $V_{INV}$ from the bus voltage $V_{BUS}$. The FETs Q310, Q312 may be rendered conductive and non-conductive in response to the drive control signals $V_{DR1}$, $V_{DR2}$. The drive control signals $V_{DR1}$, $V_{DR2}$ may be received from the module control circuit 254. The drive control signals $V_{DR1}$, $V_{DR2}$ may be coupled to the gates of the respective FETs Q310, Q312 via a gate drive circuit 318 (e.g., which may comprise part number L6382DTR, manufactured by ST Microelectronics). The module control circuit 254 may generate the inverter voltage $V_{INV}$ at a constant operating frequency fop (e.g., approximately 60-65 kHz) and thus a constant operating period $T_{OP}$. However, the operating frequency fop may be adjusted under certain operating conditions. For example, the operating frequency fop may be decreased near the high-end intensity $L_{HE}$. The module control circuit 254 may be configured to adjust a duty cycle $DC_{INV}$ of the inverter voltage $V_{INV}$ to control the intensity of an LED light engine 150 towards the target intensity $L_{TRGT}$. The module control circuit 254 may adjust the duty cycle $DC_{INV}$ of the inverter voltage $V_{INV}$ to adjust the magnitude (e.g., the average magnitude $I_{AVE}$) of the load current $I_{LOAD}$ towards the target load current $I_{TRGT}$. The magnitude of the load current $I_{LOAD}$ may vary between a maximum rated current $I_{MAX}$ and a minimum rated current $I_{MIN}$.

The inverter voltage $V_{INV}$ is coupled to the primary winding of a transformer 320 through a DC-blocking capacitor C316 (e.g., which may have a capacitance of approximately 0.047 g), such that a primary voltage $V_{PRI}$ is generated across the primary winding. The transformer 320 may be characterized by a turns ratio $n_{TURNS}$ (i.e., $N_1/N_2$), which may be approximately 115:29. A sense voltage $V_{SENSE}$ may be generated across a sense resistor R322, which may be coupled in series with the primary winding of the transformer 320. The FETs Q310, Q312 and the primary winding of the transformer 320 may be characterized by parasitic capacitances $C_{P1}$, $C_{P2}$, $C_{P3}$, respectively. The secondary winding of the transformer 320 may generate a secondary voltage. The secondary voltage may be coupled to the AC terminals of a full-wave diode rectifier bridge 324 for rectifying the secondary voltage generated across the secondary winding. The positive DC terminal of the rectifier bridge 324 may be coupled to the LED light engine 150 through an output energy-storage inductor L326 (e.g., which may have an inductance of approximately 10 mH), such that the load voltage $V_{LOAD}$ may be generated across an output capacitor C328 (e.g., which may have a capacitance of approximately 3 µF).

The current sense circuit 340 may comprise an averaging circuit for producing the load current feedback signal $V_{I-LOAD}$. The averaging circuit may comprise a low-pass filter comprising a capacitor C342 (e.g., which may have a capacitance of approximately 0.066 uF) and a resistor R332 (e.g., which may have a resistance of approximately 3.32 kΩ). The low-pass filter may receive the sense voltage $V_{SENSE}$ via a resistor R334 (e.g., which may have a resistance of approximately 1 kΩ). The current sense circuit 340 may comprise a transistor Q336 coupled between the junction of the resistors R332, R334 and circuit common. The gate of the transistor Q336 may be coupled to circuit common through a resistor R338 (e.g., which may have a resistance of approximately 22 kΩ). The gate of the transistor Q336 may receive the signal-chopper control signal $V_{CHOP}$ from the module control circuit 254. An example of the current sense circuit 340 may be described in greater detail in commonly-assigned U.S. patent application Ser. No. 13/834,153, filed Mar. 15, 2013, entitled FORWARD CONVERTER HAVING A PRIMARY-SIDE CURRENT SENSE CIRCUIT, the entire disclosure of which is hereby incorporated by reference.

Figure 4:
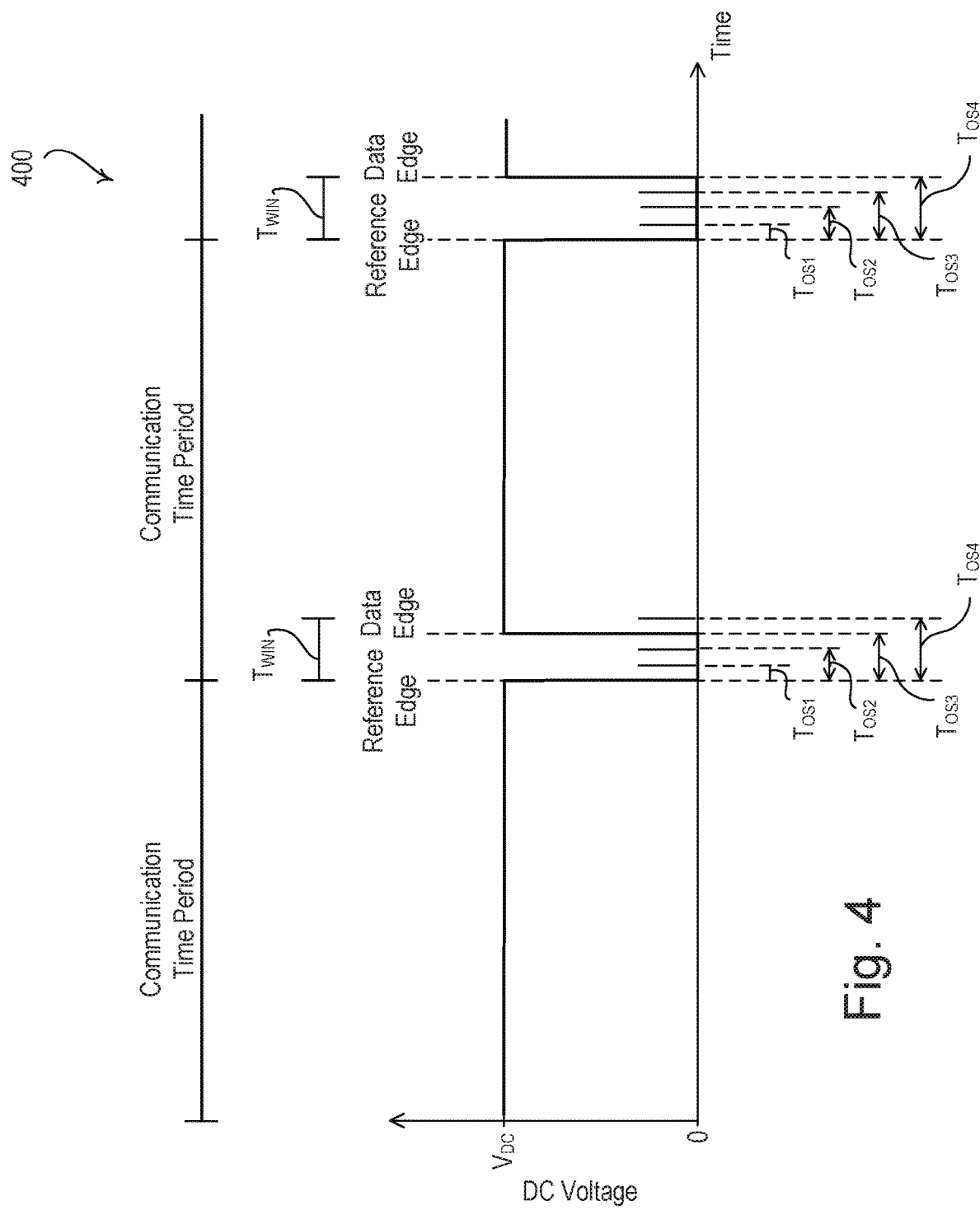
FIG. 4 is an example of a timing diagram of a DC voltage generated by a control module of a lighting panel for communicating digital messages to an electrical load.

FIG. 4 is an example of a timing diagram of a DC voltage $V_{DC}$ generated by a control module of a lighting panel (e.g., the lighting panel 102) for provide power and communicating digital messages to an electrical load. The timing diagram 400 illustrates an example data pattern of a transmitted digital message carried via the DC voltage $V_{DC}$. The DC voltage $V_{DC}$ and the data pattern may be generated by a control module (e.g., the driver module 114) of the lighting panel 102. For example, the driver module 114 may be configured to pulse-width modulate (PWM) the DC voltage $V_{DC}$ to introduce a reference edge and a data edge into the DC voltage $V_{DC}$. The time period between successive reference edges may be consistent and may define a communication time period. The communication time period may be static or adjustable based on the electrical load. Digital information (e.g., bits of the transmitted digital messages) may be encoded in the PWM duty cycle of the DC voltage $V_{DC}$. For example, the bits of the transmitted digital messages may be encoded in the firing time of a data edge (e.g., a data edge time) of the driver module 114 as measured with respect to a firing time of a reference edge (e.g., a reference edge time). In other words, the bits of the transmitted digital messages may be encoded as a function of the firing times of the reference and data edges.

The value of the digital data transmitted by the control module may be dependent upon an offset time period $T_{OS}$ (i.e., a difference) between the data edge and the previous reference edge. The control module may control the data edges to be at one of four times across the time window $T_{WIN}$, thus resulting in one of four offset time periods $T_{OS1}$, $T_{OS2}$, $T_{OS3}$, $T_{OS4}$, from the previous reference edge, such that two bits may be transmitted each communication time period. To transmit bits "00", the control module may be configured operable to pulse width modulate the DC voltage $V_{DC}$ at the first possible data edge time, such that the first offset time period Tosi exists between the reference edge and the data edge. For example, each of the possible data edge times may be an offset period difference $\Delta T_{OS}$ apart. The control module may be configured to control the offset time period $T_{OS}$ between the reference edge and the data edge to the second offset time period $T_{OS2}$ to transmit bits "01", to the third offset time period $T_{OS3}$ to transmit bits "10", and the fourth offset time period $T_{OS4}$ to transmit bits "11", for example, as shown in FIG. 4.

To decode the data, a control circuit (e.g., microprocessor) of each electrical load (e.g., LED light engine 150, accessory module, etc.) may determine if the offset time period $T_{OS}$ of each data pattern is approximately equal to one of the four offset time periods $T_{OS1}$, $T_{OS2}$, $T_{OS3}$, $T_{OS4}$ within a default tolerance $\Delta T_{OS}$, which may be equal to, for example, approximately fifty microseconds. Alternatively, the number of data edges possible in the time window $T_{WIN}$ could be greater than four (e.g., eight) in order to transmit more than two bits of data during each communication time period. The control modules of the lighting panel 102 may be configured to set the communication time period and number of data edges possible in each time window $T_{WIN}$ such that, for example, the electrical load is operable across its entire range when receiving just a portion of the full DC voltage $V_{DC}$ (e.g., the communication time period minus the entire time window).

When the control module is not transmitting a digital message to the electrical load, the control module may provide a fully conductive DC voltage $V_{DC}$. Accordingly, the DC voltage $V_{DC}$ would not have at least one reference edge in each communication cycle when the control module is not transmitting a digital message to the electrical load. Alternatively, the control module may pulse width modulate the DC voltage $V_{DC}$ at the first data edge (e.g., at $T_{OS1}$), as if the control module was continuously transmitting bits "00." Further, an accessory module may be configured to respond to the control module in a similar fashion. For example, a response time window $T_{RWIN}$ may be used where, for example, the offset time period $T_{OS}$ between a reference edge and a data edge in the response time window $T_{RWIN}$ is used to determine the response communication performed by the accessory module. The response time window $T_{RWIN}$ may be smaller in duration than the time window $T_{WIN}$, for example, since less information may need to be transmitted from the accessory module to the control module in the lighting panel 102. Alternatively, every other time window $T_{WIN}$ may be used as the response time window $T_{RWIN}$.

The system utilizing the methods shown in FIG. 4 allows for reuse of existing building wiring to accommodate new lighting fixtures as only two wires are required between the lighting panel and lighting fixtures. For example, this legacy configuration of wiring may exist between traditional dimming panels and the traditional lighting loads, such as incandescent bulbs. As no new wires are required between the lighting panel location and the fixture location, this new system provides an opportunity for system upgrades without pulling new wires.

Figure 5:
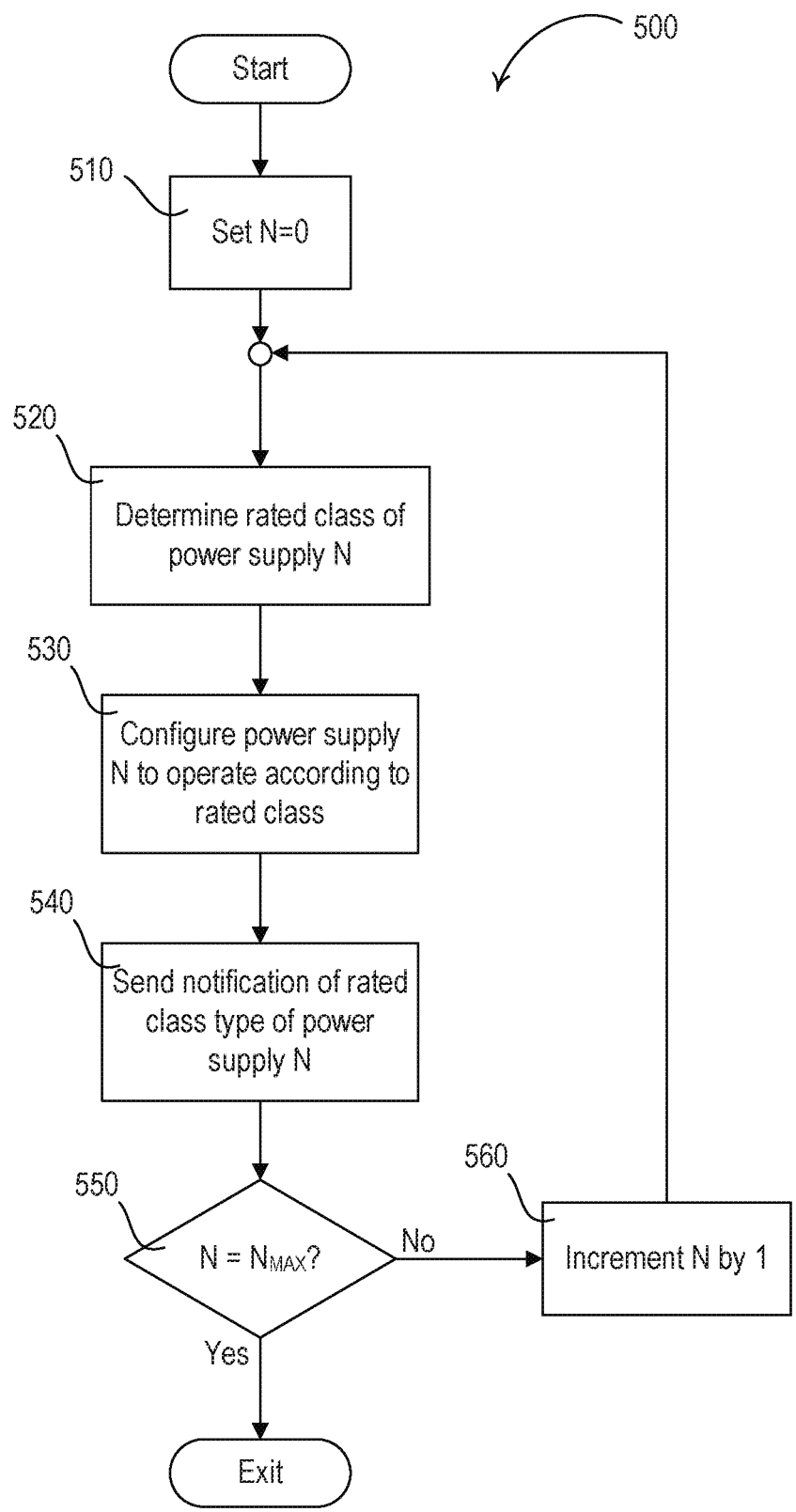
FIG. 5 is an example flowchart of a classification detection procedure performed by an electrical panel.

FIG. 5 is an example flowchart of a power supply classification detection procedure 500 performed by an electrical panel, such as the lighting panel 102. The electrical panel may detect (e.g., automatically detect) the rated class type of one or more power supplies of the electrical panel. For example, the rated class types may include, but are not limited to, Low Voltage Class 2, Low Voltage Class 1, and High Voltage Class 1. Although the detection procedure 500 is described with reference to the Low Voltage Class 2, the Low Voltage Class 1, and the High Voltage Class 1 class types, the detection procedure 500 may detect any combination or type of rated class types of power supplies. Further, it should be appreciated that a panel control circuit (e.g., the panel control circuit 104) and/or one or more of the power supplies themselves may perform the detection procedure 500.

The electrical panel may set N=0 at 510, where $N_{MAX}$ is the total number of power supplies of the electrical panel (e.g., the total number of adjustable/configurable power supplies of the electrical panel). At 520, the electrical panel may determine the rated class of the power supply N. The electrical panel may determine the rated class of the power supply, for example, based on the control modules and/or electrical loads that are connected to the power supply, and in turn, the desired operational characteristics of the power supply. For example, the power supply and/or the panel control circuit may be configured to measure the amount of current, voltage, and/or power requested on the link, e.g., at the output terminals of the power supply, to determine its desired class type. Alternatively or additionally, a control module and/or electrical load (e.g., an accessory module located at the electrical load) may communicate (e.g., by transmitting a digital or analog message) to the power supply and/or panel control circuit indicating its power requirements, such as an amount of power needed, type of dimming required, etc.

After determining the rated class of the power supply N at 520, the electrical panel may configured the power supply N to operate according to the rated class at 530. For example, the electrical panel may configure the power supply to control (e.g., limit) its output power accordingly (e.g., operate as a Low Voltage Class 2 power supply, a Low Voltage Class 1 power supply, a High Voltage Class 1 power supply, etc.). At 540, the electrical panel may send a notification (e.g., an alert and/or report) of the rated class type of the power supply N. For example, the panel control circuit may send a notification of the rated class type of the power supply N to a network or system administration (e.g., via the gateway device 138). Further, in instances where the detection procedure 500 is performed by the power supplies themselves, the power supply N may send a notification to the panel control circuit at 540 indicating its rated class type. Further, in instances where the detection procedure 500 is performed by the power supplies themselves, 510, 550, and 560 of the detection procedure 500 may be omitted.

At 550, the electrical panel may determine whether the $N=N_{MAX}$. If the electrical panel determines that N is less than $N_{MAX}$, then the electrical panel may increment N by 1 at 560, and repeat 520-540 for a subsequent power supply. If the electrical panel determines that $N=N_{MAX}$ at 550, then the detection procedure 500 may exit. The electrical panel may perform the detection procedure 500 at start-up and/or periodically throughout operation. For example, the electrical panel may be configured to adjust the class type of a power supply after installation. For instance, the a particular power supply may be initially configured to operate as a Class 1 power supply (e.g., a High Voltage Class 1 power supply), and later be configured (e.g., by the panel control circuit 104) to operate as another class of power supply (e.g., as a Low Voltage Class 2 power supply provided that the proper redundancy exists).

As noted herein, an electrical panel, such as the lighting panel 102, may be connected to one or more DC power sources via the DC line feed 134 and/or via the battery bank feed 133. The DC power sources may include any combination of an alternative energy sources, such as a PV power supply, a wind turbine system, a hydroelectric system, a battery bank, etc. The electrical panel may include a grid-tie inverter (e.g., or, for example, the grid-tie inverter may be connected to the electrical panel but external to the electrical panel). The grid-tie inverter may be electrically connected between the DC line feed (e.g., and/or the battery bank feed) and the AC line feed 132. The grid-tie inverter may be configured to receive DC power via the DC line feed, convert the DC power to AC power, and provide the AC power to the AC line feed (e.g., and ultimately to an external electrical grid). The electrical panel may sell a portion or all of the DC power received from one or more DC power sources back to the electrical grid, for example, after using a portion of the DC power for powering one or more electrical loads. The amount or percentage of DC power sold back to the electrical grid may be determined by the electrical panel using a grid-tie inverter control procedure.

Figure 6:
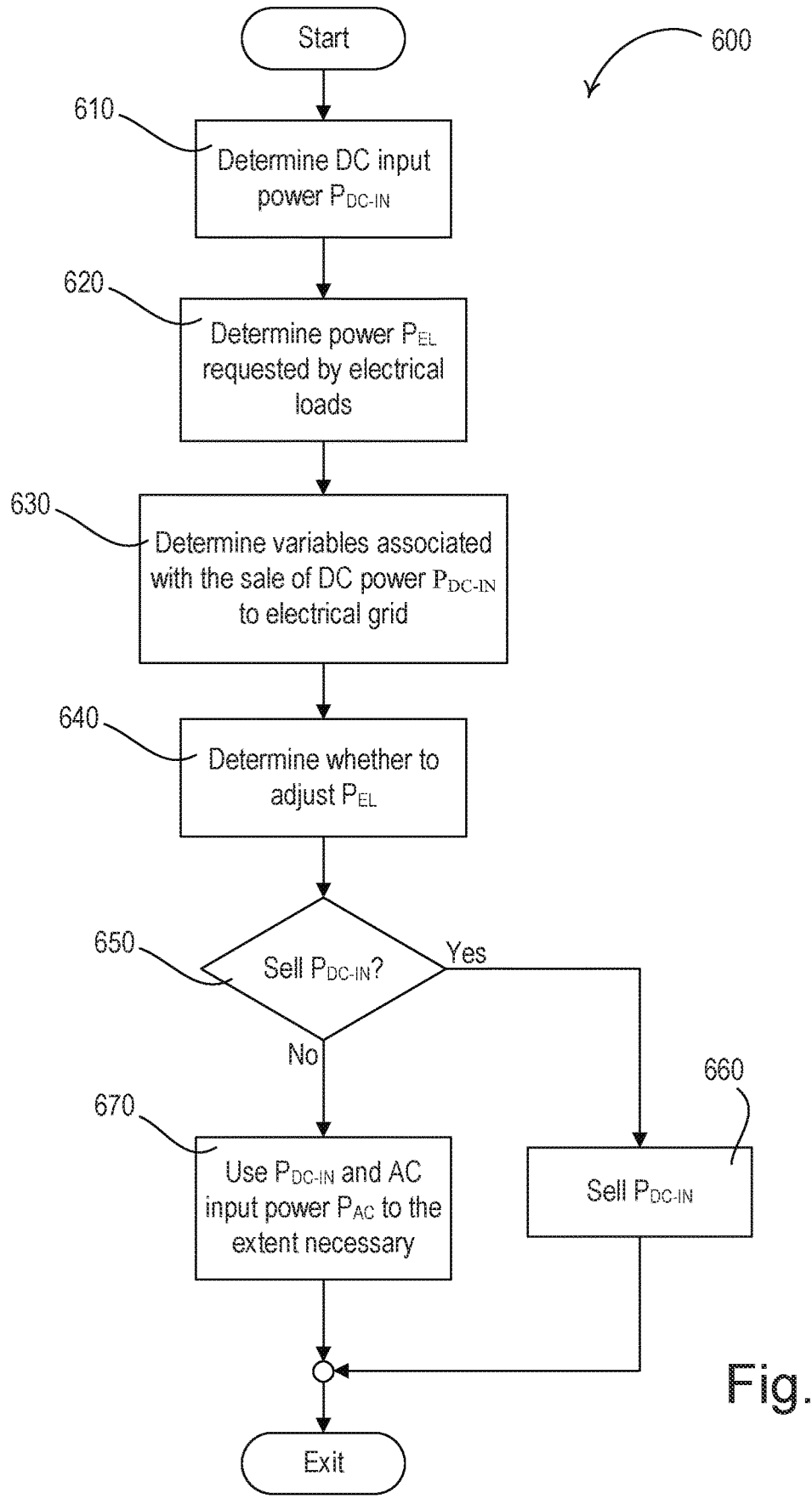
FIG. 6 is an example of a grid-tie inverter control procedure performed by an electrical panel

FIG. 6 is an example of a grid-tie inverter control procedure 600 performed by an electrical panel, such as the lighting panel 102. The electrical panel (e.g., the panel control circuit 104) may perform the grid-tie inverter control procedure 600 continuously or periodically, for example, at scheduled times of the day, whenever an electrical load is adjusted (e.g., turned on or off), and/or in response to an input from a system administrator. At 610, the electrical panel may determine (e.g., measure) the amount of DC input power $P_{DC-IN}$ that is received via the DC line feed 134 and/or via the battery bank feed 133 from the one or more DC power sources. At 620, the electrical panel may determine the amount of power $P_{EL}$ requested by the electrical loads of the electrical panel (e.g., the power supplies). The power requested by the electrical loads $P_{EL}$ may vary continuously, for example, in response to other inputs into the load control system (e.g., the load control system 100), such as via remote control devices, occupancy/vacancy sensors, daylight sensors, etc.

The electrical panel may then determine how much DC input power $P_{DC-IN}$ to use versus to sell back to the electrical grid based on one or more factors. These factors may include, but are not limited to, the amount of DC input power $P_{DC-IN}$, the amount of power $P_{EL}$ requested by the electrical loads of the electrical panel, environmental conditions, such as weather, whether the electrical panel is receiving AC input power $P_{AC}$ (e.g., whether there is an outage), a price index of AC input power $P_{AC}$, the time of day, the day of the week, the month of the year, the location of the electrical panel, etc. For example, at 630 of the grid-tie inverter control procedure 600, the electrical panel may determine the factors that are associated with the sale of AC power to the electrical grid. The factors may be static or may adjust, for example, based on settings received from a system administrator. The factors may also be weighted.

At 640, the electrical panel may determine to adjust (e.g., lower) the power $P_{EL}$ provided to one or more electrical loads (e.g., dim one or more LED light engines 150) based on the determined factors. The electrical panel may determine to lower the power $P_{EL}$ provided to the electrical loads within a window of acceptance. For example, the electrical panel may determine to lower the power $P_{EL}$ such that the electrical panel limits the amount of received AC input power $P_{AC}$ (e.g., potentially doesn't receive any AC power). The electrical panel may determine to lower the power $P_{EL}$, for example, in instances where the price index of AC input power $P_{AC}$ exceeds a threshold, on particular days of the week and/or times of the day, where there is an outage and the electrical panel isn't receiving any AC input power $P_{AC}$, and/or the like.

At 650, the electrical panel may determine whether to sell any DC input power $P_{DC-IN}$ to back to the electrical grid. For example, if the electrical panel determines that the amount of power $P_{EL}$ (e.g., the adjust $P_{EL}$) is less than the amount of DC input power $P_{DC-IN}$, then the electrical panel may sell any excess DC input power $P_{DC-IN}$ back to the grid at 660.

If, for example, the electrical panel determines that the amount of power $P_{EL}$ (e.g., the adjust $P_{EL}$) is equal to or exceeds the amount of DC input power $P_{DC-IN}$, then, at 670, the electrical panel may determine to use all of the DC input power $P_{DC-IN}$ to meet the request of the loads and, to the extent necessary, also use AC input power $P_{AC}$. By using all of the DC input power $P_{DC-IN}$, the electrical panel may avoid a double conversion (e.g., converting DC input power $P_{DC-IN}$ to AC for sale, and converting AC input power $P_{AC}$ to DC for use by the electrical loads). Further, even if the electrical panel determines that the amount of power $P_{EL}$ (e.g., the adjust $P_{EL}$) is equal to or exceeds the amount of DC input power $P_{DC-IN}$, the electrical panel may still determine, based on the determined factors, to store all or a portion of the DC input power $P_{DC-IN}$ in the battery banks via the battery bank feed 133.

Although described with reference to the LED light engines 150 and the motorized window treatments 160, one or more embodiments described herein may be used with other electrical loads and load control devices. For example, one or more of the embodiments described herein may be performed by a variety of load control devices that are configured to control a variety of electrical load types, such as, for example, a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). A lighting panel 102 may be coupled to and/or adapted to control multiple types of electrical loads in a load control system.

The invention claimed is:

1. An electrical control panel for controlling a plurality of electrical loads, the control panel comprising:
    a control circuit;
    a plurality of power supplies, where each power supply is configured to receive alternating current (AC) power and output direct current (DC) power; and
    a plurality of control modules, wherein more than one control module is associated with each of the plurality of power supplies; and
    wherein a control module of the plurality of control modules is configured to receive DC power from the associated power supply, and configured to provide a DC voltage to at least one electrical load over a two-wire link via an accessory module located at the electrical load, wherein the control module and the accessory module provide for control of the electrical load, and wherein the control module is further configured to provide a digital message in the DC voltage.

2. The control panel of claim 1, wherein a subset of the electrical loads each comprise a respective accessory module associated with a control module.

3. The control panel of claim 2, wherein the associated control module and accessory module operate in tandem to provide proper power for operation and control of the corresponding electrical load.

4. The control panel of claim 1, wherein the digital message comprises a command for controlling the at least one electrical load.

5. The control panel of claim 1, wherein the control circuit is configured to provide a report relating to at least one of the operation and configuration of the control panel.

6. The control panel of claim 1, wherein the control circuit is configured to receive a configuration from a remote entity relating to at least one of the operation and configuration of the control panel.

7. The control panel of claim 1, wherein the control module is configured to receive a response digital message from the accessory module.

8. The control panel of claim 1, wherein the DC voltage includes a pulse-width modulated (PWM) DC voltage in which each pulse includes a leading data edge and a trailing reference edge such that a temporal duration existent between the trailing reference edge and the leading data edge of successive PWM pulses defines an offset time period.

9. The control panel of claim 8, wherein the offset time period comprises a variable temporal duration offset time period, the temporal duration of the offset time period determined, at least in part, on a demand presented by one or more of the plurality of electrical loads.

10. The control panel of claim 8, wherein the digital message includes one or more data bits based on a temporal duration of each respective one of a plurality of offset time periods.

11. The control panel of claim 10, wherein the digital message includes one or more data bits based on respective durations of a plurality of successive offset time periods.

12. The control panel of claim 10, wherein the temporal duration of each of the plurality of offset time periods corresponds to a unique data bit sequence.

13. The control panel of claim 10, wherein the plurality of offset time periods consist of four offset time periods, each having a different temporal duration, and the data bits consist of a unique two data bit sequence determined by the duration of respective ones of the four offset time periods.

14. The control panel of claim 1, wherein the accessory module is configured to process the digital message.

15. A control module couplable to an AC/DC power supply disposed in a modular distribution panel, the control module to:

generate a pulse-width modulated (PWM) DC signal, each pulse in the PWM signal including a leading data edge and a trailing reference edge such that a temporal duration existent between the trailing reference edge and the leading data edge of successive PWM pulses defines an offset time period;

associate a unique data bit sequence with each respective one of a plurality of offset time periods, each of the offset time periods having a different temporal duration; and selectively adjust the temporal duration of at least one of the plurality of offset time periods to communicate a digital message that includes one or more data bit sequences from the control module to an electrical load coupled to the control module.

16. The control module of claim 15, the control module to further:

generate a digital message that includes a plurality of data bit sequences, each of the plurality of data bit sequences based on the temporal duration of each respective one of a plurality of offset time periods.

17. The control panel of claim 16, wherein the digital message includes data based on the temporal duration of each respective one of a plurality of successive offset time periods.

18. The control panel of claim 16, wherein the temporal duration of each of the plurality of offset time periods determines the unique data bit sequence.

19. The control panel of claim 15, wherein the plurality of offset time periods consists of four offset time periods, each having a different duration, and the one or more data bits consist of a unique two data bit sequence determined by the duration of respective ones of the four offset time periods.

20. A control module connected to an AC/DC power supply in a control panel, the control module configured to:

generate a first pulse including a leading data edge and a trailing reference edge;

generate a second pulse including a leading data edge and a trailing reference edge, wherein an offset time period between the trailing reference edge of the first pulse and the leading data edge of the second pulse represents a unique data bit or data bit sequence; and adjust a temporal duration of the offset time period to communicate a digital message from the control module to an electrical load coupled to the control module.

21. The control module of claim 20, wherein the control module is further configured to select one offset period from four offset time periods, each having a different temporal duration.

22. The control module of claim 21, wherein each offset time period corresponds to a different unique data bit sequence.

23. The control module of claim 21, wherein each offset time period corresponds to a different data transmission.

24. The control module of claim 20, wherein the digital message comprises a plurality of data bit sequences.

\* \* \* \* \*